United States Patent
Xiao et al.

(10) Patent No.: US 8,902,834 B2
(45) Date of Patent: Dec. 2, 2014

(54) FEEDBACK INTERVAL CONTROL

(75) Inventors: Hui Xiao, Middlesex (GB); Luciano Pietro Giacomo Sarperi, Bern (CH)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 13/470,900

(22) Filed: May 14, 2012

(65) Prior Publication Data
US 2012/0230274 A1    Sep. 13, 2012

Related U.S. Application Data

(63) Continuation of application No. PCT/EP2010/070315, filed on Dec. 20, 2010.

(30) Foreign Application Priority Data

Dec. 21, 2009  (EP) .................................... 09180243

(51) Int. Cl.
| | | |
|---|---|---|
| *H04W 72/04* | (2009.01) | |
| *H04B 7/04* | (2006.01) | |
| *H04B 7/02* | (2006.01) | |
| *H04B 7/06* | (2006.01) | |

(52) U.S. Cl.
CPC ............ *H04B 7/0417* (2013.01); *H04B 7/0478* (2013.01); *H04B 7/0639* (2013.01);
(Continued)

(58) Field of Classification Search
CPC ..... H04W 24/00; H04W 80/04; H04W 84/12; H04W 88/06; H04W 88/08; H04W 84/18; H04W 72/04; H04W 76/00; H04W 36/30; H04W 36/24; H04W 52/40; H04W 72/0446; H04W 43/50; H04W 43/0852
USPC ......... 370/252, 328–329, 332, 334, 336, 342, 370/468; 455/77; 375/267
See application file for complete search history.

(56) References Cited

U.S. PATENT DOCUMENTS

| | | | |
|---|---|---|---|
| 7,359,470 B2 | 4/2008 | Molisch et al. | |
| 7,486,655 B2 | 2/2009 | Ting et al. | |

(Continued)

FOREIGN PATENT DOCUMENTS

| | | |
|---|---|---|
| CN | 101415229 | 4/2009 |
| EP | 1437854 | 5/2002 |

(Continued)

OTHER PUBLICATIONS

Sharp: "Considerations on precoding scheme for DL joint processing CoMP"; Agenda Item 12.3; 3GPP TSG RAN WG1 Meeting #55bis; R1-090022; Ljubljana, Slovenia; Jan. 12-16, 2009. [Ref. ISR & ESR].

(Continued)

*Primary Examiner* — Kwang B Yao
*Assistant Examiner* — Syed M Bokhari
(74) *Attorney, Agent, or Firm* — Myers Wolin, LLC

(57) ABSTRACT

A multiple-input multiple-output (MIMO) wireless communication systems that includes a plurality of adjacent cells, each containing one or more base stations operable to transmit signals to, and receive signals transmitted from, one or more users. The users are operable to feed back to the relevant base station(s) channel state information relating to channel(s) between the relevant base station(s) and the users, and the base stations are operable to adapt signals for transmission to users, based on the fed back channel state information, to account for channel variations. The proposed method involves obtaining information related to time-variation in channel spatial structure, and adjusting the timing with which a user feeds back channel state information, based on the time variation in channel spatial structure. The invention helps to achieve a suitable balance between the feedback overhead and system performance, and may be operable in systems operating according to various CoMP transmission modes.

16 Claims, 14 Drawing Sheets

(52) U.S. Cl.
CPC ............ *H04B 7/0632* (2013.01); *H04B 7/0626* (2013.01); *H04B 7/0647* (2013.01); *H04B 7/063* (2013.01); *H04B 7/024* (2013.01); *H04B 7/0421* (2013.01)
USPC ........................................................ 370/329

(56) References Cited

U.S. PATENT DOCUMENTS

| | | | |
|---|---|---|---|
| 2003/0157900 | A1 | 8/2003 | Gaal et al. |
| 2006/0056533 | A1 | 3/2006 | Molisch et al. |
| 2007/0298728 | A1* | 12/2007 | Imamura et al. ................ 455/77 |
| 2008/0310542 | A1* | 12/2008 | Gao et al. ....................... 375/267 |
| 2011/0085460 | A1* | 4/2011 | Zhang et al. ................... 370/252 |
| 2011/0158164 | A1* | 6/2011 | Palanki et al. ................. 370/328 |

FOREIGN PATENT DOCUMENTS

| | | |
|---|---|---|
| WO | 02/103926 | 12/2002 |
| WO | 2008/069796 | 6/2008 |
| WO | 2008/115735 | 9/2008 |
| WO | 2009/023681 | 2/2009 |
| WO | 2009/033358 | 3/2009 |

OTHER PUBLICATIONS

Herdin: Correlation Matrix Distance, a Meaningful Measure for Evaluation of Non-Stationary MIMO Channels; IEEE 2005. [Ref. ISR & ESR].

International Search Report issued for corresponding International Patent Application No. PCT/EP2010/070315 mailed Mar. 15, 2011.

European Search Report issued for corresponding European Patent Application No. EP09180243 with completion of the search dated May 17, 2010.

Japanese Office Action issued by the Japanese Patent Office for corresponding Japanese Patent Application No. 2012-543846, issued on Nov. 12, 2013, with English translation.

3rd Generation Partnership Project; Spatial channel model for Multiple Input Multiple Output (MIMO) simulations (Release 8); 3GPP TR 25.996 V8.0.0; Dec. 2008.

3rd Generation Partnership Project; Further Advancements for E-UTRA Physical Layer Aspects (Release 9); 3GPP TR 36.814 V0.4.1; Feb. 2009.

Motorola: "CoMP Operation Based on Spatial Covariance Feedback and Performance Results of Coordinated SU/MU Beamforming"; Agenda Item 15.2; 3GPP TSG RAN1#57bis; R1-092634; Los Angeles, USA; Jun. 29-Jul. 3, 2009.

Nokia Siemens Networks, Nokia; "Scalable CoMP solutions for LTE Advanced"; Agenda 11.4; 3GPP TSG-RAN WG1 Meeting #55; R1-084322; Prague, Czech Republic; Nov. 10-14, 2008 [URL: http://www.3gpp.org/ftp/tsg_ran/WG1_RL1/TSGR1_55/docs/].

Huawei: "Adaptive Codebook Designs for MU-MIMO"; Agenda Item 15.6; 3GPP TSG RAN WG1 meeting #56bis; R1-091282; Seoul, Republic of Korea; Mar. 23-27, 2009.

Qualcomm Europe: "TP for feedback in support of DL CoMP for LTE-A TR" 3GPP TSG-RAN WG1 #57; R1-092290; San Francisco, CA. USA; May 4-8, 2009.

Texas Instruments: "Further Consideration on CoMP Feedback" Agenda Item 15.2; 3GPP TSG RAN WG1 57bis; R1-092397; Los Angeles, USA; Jun. 29-Jul. 3, 2009.

Alcatel-Lucent, Philips, Qualcomm: "High-Level Principles for CSI feedback for DL MIMO and COMP in LTE-A"; Agenda Item 15.6; 3GPP TSG RAN WG1 Meeting #57bis; Tdoc R1-092309; Los Angeles, USA; Jun. 29-Jul. 3, 2009.

Motorola: "Spatial Correlation Feedback to Support LTE-A MU-MIMO and CoMP: System Operation and Performance Results"; Agenda Item 15.2; TSG-RAN WG1 #57; R1-091936; San Francisco, USA; May 4-8, 2009.

Huang et al.: "Performance of multiuser MIMO and network coordination in downlink cellular networks"; Downloaded Dec. 2, 2009 from IEEE Xplore.

Foschini et al.: "MIMO Wireless and Mobile Communications: Coordinating multiple antenna cellular networks to achieve enormous spectral efficiency"; IEE Proc.-Commun., vol. 153, No. 4; Aug. 2006.

* cited by examiner

FEEDBACK INTERVAL CONTROL

This is a continuation of Application PCT/EP2010/070315, filed Dec. 20, 2010, now pending, which claims priority from the European Patent Application No. 09180243.9, filed Dec. 21, 2009, the contents of each are herein wholly incorporated by reference.

The present invention relates to wireless communication systems, and in particular to multi-cell multiple-input multiple-output ("MIMO") systems in which there is coordination of transmissions between cells. It is envisaged that the invention may be implemented in systems compliant with the 3GPP LTE, 3GPP LTE-A, IEEE 802.16 and 802.11 groups of standards, however it is to be clearly understood that these are merely examples, and the invention could equally be implemented in any other form of multi-cell MIMO system.

UNDERLYING TECHNOLOGY

This section gives an introductory overview to certain relevant technologies and principles involved in the field to which the present invention relates, and helps to provide context for the invention.

Wireless communication systems are widely known in which base stations (BSs) communicate with subscriber stations (SSs) or mobile stations (MSs) or user equipments (UEs) within range of the BSs. The terms subscriber station (SS), mobile station (MS), user equipment (UE) and the like may be considered interchangeable for the purposes of this specification. They will generally be referred to as users or UEs, although this is for convenience only and no limitation is to be implied from this. Also, whilst the above terms may be considered interchangeable, the term "mobile" in particular should not be construed to necessarily imply that the mobile station, subscriber station etc (i.e. the "user" or UE) must always be movable. In many cases it will indeed be movable (e.g. a mobile handset). However, wireless communication systems (and the present invention) can also operate where the user (i.e. the SS, MS, UE etc) is fixed in position at a particular location.

The area covered by one or more (typically 3) base stations (i.e. the geographical region serviced by that/those base station(s)) is generally referred to as a cell, and typically many base stations (BSs) are provided in appropriate locations so as to cover a wide geographical area more or less seamlessly with adjacent cells. Each BS divides its available bandwidth, i.e. frequency and time resources, into individual resource allocations for the users. There is a constant need to increase the capacity of such systems, and to improve the efficiency of resource utilisation, in order to accommodate more users, more data-intensive services and/or higher data transmission rates.

OFDM (Orthogonal Frequency Division Multiplexing) is one known technique for transmitting data in a wireless communication system. An OFDM-based communications scheme divides data symbols to be transmitted among a large number of subcarriers, hence the term frequency division multiplexing. Data is modulated onto a subcarrier by adjusting its phase, amplitude, or both phase and amplitude. The "orthogonal" part of the name OFDM refers to the fact that the spacings of the subcarriers in the frequency domain are specially chosen so as to be orthogonal, in a mathematical sense, to the other subcarriers. In other words, they are arranged along the frequency axis such that the sidebands of adjacent subcarriers are allowed to overlap but can still be received without inter-subcarrier interference. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users, the result is a multi-access system referred to as OFDMA (Orthogonal Frequency Division Multiple Access). The term OFDM as used in the art is often intended to include OFDMA. The two terms may therefore be considered interchangeable for the purposes of the present explanation. By assigning distinct frequency/time resources to each user in a cell, OFDMA can substantially avoid interference among the users within a given cell.

A further modification of the basic OFDM scheme is called MIMO-OFDM, where MIMO stands for multiple-input multiple-output. This type of scheme employs multiple antennae at the transmitter and/or at the receiver (often at both) to enhance the data capacity achievable between the transmitter and the receiver. Typically, this is used to achieve an enhanced data capacity between one or more base stations (BSs) and the user equipments (UEs) served by that/those base station(s).

By way of example, a 2×2 MIMO configuration contains two antennae at the transmitter and two antennae at the receiver. Likewise, a 4×4 MIMO configuration contains four antennae at the transmitter and four antennae at the receiver. There is no need for the transmitter and receiver to employ the same number of antennae. Typically, a BS in a wireless communication system will be equipped with many more antennae in comparison with a UE (such as, for example, a mobile handset), owing to differences in power, cost and size limitations.

The term channel is used to describe the frequency (or equivalently time delay) response of the radio link between a transmitter and a receiver. The so-called MIMO channel (or "channel") contains all the subcarriers (see the discussion on subcarriers above), and covers the whole bandwidth of transmission. A MIMO channel contains many individual radio links. The number of these individual radio links, which may be individually referred to as single-input single-output (SISO) channels (also called sub-channels), is $N_r \times N_T$, where $N_T$ is the number of antennae at the transmitter and $N_r$ is the number of antennae at the receiver. For example, a 3×2 MIMO arrangement contains 6 links, hence it has 6 SISO channels.

Considering the simplified 2×3 MIMO system schematically represented in FIG. 1, it can be seen that antenna R0 of receiver R receives transmissions from each of the transmitter antennae T0, T1 and T2 of transmitter T. Similarly, receiver antenna R1 receives transmissions from transmitter antennae T0, T1 and T2. Therefore, the signal received at the receiver comprises (or is made up of) a combination of the transmissions (i.e. of the SISO channels) from the transmitter antennae. In general, SISO channels can be combined in various ways to transmit one or more data streams to the receiver.

FIG. 2 is a conceptual diagram of a more generalized MIMO system. In FIG. 2, a transmitter transmits signals utilizing $N_T$ transmitting antennae, and a receiver receives the signals from the transmitter utilizing $N_r$ receiving antennae. In order to create a mathematical model of the characteristics of the overall MIMO channel, it is necessary to represent the individual SISO channels between the transmitter and receiver. As shown in FIG. 2, the individual SISO channels are represented by $H_{0,0}$ to $H_{N_r-1, N_T-1}$, and as suggested in the Figure, these form terms of a matrix commonly called the channel matrix or channel response matrix H. It will be recognised that $H_{0,0}$ represents the channel characteristics (for example, channel frequency response) for transmitting signals from the transmitting antenna 0 to the receiving antenna 0. Similarly, "$H_{N_r-1, N_T-1}$" represents the channel characteristics for transmitting signals from the transmitting antenna $N_T-1$ to the receiving antenna $N_r-1$, and so on.

In FIG. 2, the symbols $x_0$ to $x_{N_T-1}$, which represent the signal elements transmitted using the transmitting antennae 0 to $N_T-1$, together form a transmitted signal vector $\underline{x}$ (i.e. $\underline{x}=(x_0, x_1, x_2, \ldots, x_{N_T-1})^T$), where $(\ )^T$ indicates the vector transpose. Likewise, the received signals elements $y_0$ to $y_{N_r-1}$ received by receiving antennae 0 to $N_r-1$ together form a received signal vector $\underline{y}$ (i.e. $\underline{y}=(y_0, y_1, y_2, \ldots, y_{N_r-1})^T$). The relationship between the vectors $\underline{y}$ and $\underline{x}$ for the simplified system shown in FIG. 2 (and also that shown in FIG. 3) may be modelled by the basic MIMO system equation:

$$\underline{y}=H\underline{x}+\underline{n} \qquad (I)$$

where H is the channel matrix described above and n is a vector representing noise. Noise elements $n_0$ to $n_{N_r-1}$ are illustrated in FIG. 2 and represent noise in the respective received signal elements $y_0$ to $y_{N_r-1}$. Hence, the noise vector $\underline{n}$ is given by $\underline{n}=(n_0, n_1, n_2, \ldots, n_{N_r-1})^T$. It is generally assumed for the purposes of the model given by equation (I) that the noise represented by vector $\underline{n}$ is additive Gaussian white noise with zero mean and variance $\sigma^2$.

It should be noted that, despite the name "multiple-input multiple-output", MIMO systems can operate even if one of the transmitter and the receiver has only one antenna (i.e. even if $N_T=1$ or $N_r=1$). In fact, MIMO systems might technically be said to operate even where the transmitter and the receiver both have only one antenna (i.e. where $N_T=N_r=1$), although this situation might be considered to constitute a special case because, in the mathematical model of the equation (I), the MIMO channel would then be represented by a scalar rather than matrix H.

MIMO transmission schemes may be described as "non-adaptive" and "adaptive". In the non-adaptive case, the transmitter does not have any knowledge of the channel properties and this limits performance, as it cannot take account of changes in conditions which cause changes in the state of the channel. Adaptive schemes rely on the feedback of information (channel-state information or CSI) from the receiver to the transmitter, allowing modification of the transmitted signal to account for changing conditions and to maximise data throughput. The present invention is concerned primarily with these adaptive types of MIMO schemes.

The feedback just described is important, in particular, in so called FDD (Frequency Division Duplex) systems, where uplink transmissions (i.e. transmissions from user equipment to base station) and downlink transmissions (vice-versa) employ two different carrier frequencies. Because of the frequency change, the uplink and downlink channels are different and CSI needs to be fed back in order to provide an adaptive scheme; in particular so that the transmitter can perform so-called "link adaptation" in order to account for channel variations (such as changes in the channel state) when transmitting signals. On the other hand, in so-called TDD (Time Division Duplex) systems, the uplink and downlink are transmitted in two adjacent time slots on the same frequency. The two time slots are generally within the channel coherence time, meaning that it can be reasonably assumed that the channel state does not change, so channel state information need not be fed back. The transmitter can estimate the channel from the received signal on the reverse link, usually aided by the insertion of pilots or known waveforms by the transmitter into the signal sent on the reverse link.

FIG. 3 is a diagram representing a MIMO system similar to that shown in FIG. 1, but more generalised. MIMO system 1 comprises a transmitter 2 which comprises a plurality of transmitting antennae (0), (1), . . . , ($N_T-1$) and a receiver 3 which comprises a plurality of receiving antennae (0), (1), . . . , ($N_r-1$). The transmitter 2 transmits symbols 0, 1, . . . , $N_T-1$ using the $N_T$ transmitting antennae. The symbols can be created from one data stream, referred to as vertical encoding, or different data streams, referred to as horizontal encoding. In addition, each transmitted symbol corresponds to, for example, one-bit data if the modulation method is binary phase-shift keying (BPSK), or corresponds to two-bit data if the modulation method is quadrature phase-shift keying (QPSK). These concepts will be familiar to those skilled in the art. The receiver 3 receives the signals transmitted from the transmitter 2 using the $N_r$ receiving antennae, and it comprises a signal regeneration unit 4 which regenerates the transmitted symbols from the signals received.

As indicated by the arrows in FIG. 3, the signals transmitted from a plurality of the transmitting antennae are received by a plurality of receiving antennae, giving rise to $N_r \times N_T$ possible subchannels in total. In other words, the signals transmitted from the transmitting antenna (0) are received by receiving antennae (0) through ($N_r-1$), the signals transmitted from the transmitting antenna (1) are received by receiving antennae (0) through ($N_r-1$), etc. The characteristics of the subchannel which propagates the signals from the i-th transmitting antenna to the j-th receiving antenna are expressed as "$H_{ji}$" and form one component term of the $N_r \times N_T$ channel matrix H.

By way of further background explanation, a MIMO-OFDM transmitter and a MIMO-OFDM receiver will be briefly outlined with reference to FIGS. 4 and 5 respectively. In the OFDM transmitter schematically shown in FIG. 4, high-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to M sub-carriers. The output from each encoder is carried separately on a plurality of sub-carriers. The modulated signals are frequency-division multiplexed by M-point Inverse Fast Fourier Transform (IFFT) and the guard interval is added. The resulting OFDM signal is converted into an analog signal by a D/A converter and is upconverted into RF band and transmitted over the air.

At the MIMO-OFDM receiver schematically shown in FIG. 5, the received signals from the $N_r$ receiver antennae are filtered by a band pass filter (BPF), and then down-converted to a lower frequency. The down-converted signal is sampled by A/D converter (namely, converted into a digital signal), and the guard interval is removed before the sampled data is fed to the M-point Fast Fourier Transformer (FFT). After Fourier transformation is performed on each of the signals received through the $N_r$ receiver antennae, they are fed to the MIMO signal processing unit 11. The MIMO signal processing unit 11 comprises the signal regeneration unit 4 (as shown in FIG. 3) which performs processing to compensate for the channel characteristics.

The discussion above of the transmitter (FIG. 4) and receiver (FIG. 5) is given by way of summary explanation only. Those skilled in the art will be generally familiar with such devices and the principles involved in their operation.

It should be noted that, for the purposes of explanation, the above discussion focused mainly on the case of a single transmitter sending MIMO signals to a single receiver, but of course practical MIMO wireless communication systems are generally much more elaborate than this, providing many mutually adjacent cells in which base stations transmit over respective MIMO channels to one or more users/UEs simultaneously. In fact, the present invention is largely directed at these more elaborate systems, and issues associated with them, as discussed below.

BACKGROUND TO THE INVENTION

As explained above, the means by which frequency resources are utilised in conventional OFDMA-MIMO schemes prevents or significantly limits interference among users within a given cell. In other words, intra-cell interference is substantially avoided. However, in the more elaborate multi-cellular networks discussed in the previous paragraph, the benefits of OFDMA and MIMO transmission can often be limited by inter-cell interference.

Inter-cell interference may arise, for example, because the frequency resources (i.e. the carriers and subcarriers) utilised by base stations in transmitting data to users in one cell are identical to the frequency resources utilised by base stations in transmitting data to users in an adjacent cell. In other words, in the kinds of wireless communication systems in which the present invention may find use, there is likely to be, using terminology common in the art, 1:1 frequency reuse between adjacent cells. The effect of this can be particularly significant for so-called "cell-edge users" located near the boundary between cells. For a cell-edge user, the distance to the one base station currently serving that user may be roughly the same as, or only marginally different to, the distances to the base stations that are in adjacent cells. As a result, from the point of view of the user near the cell edge, the signal strength received from the serving base station may be only marginally stronger than, or approximately the same as, the signal strength from the base stations in the adjacent cells, as seen by the cell-edge user. And because common frequency resources are used in adjacent cells (i.e. there is simultaneous use of substantially identical transmission frequencies in adjacent cells), signals being transmitted in the adjacent cells can often interfere with data being transmitted to the cell-edge user.

One method which has been proposed for addressing this difficulty is to coordinate the MIMO transmissions among multiple base stations (i.e. coordinating transmissions in adjacent or nearby cells) to eliminate or reduce this inter-cell interference. A full explanation of the techniques employed to achieve this coordination is not necessary for the purposes of this explanation. For present purposes it is sufficient to note that this coordination can reduce or eliminate inter-cell interference among coordinated cells (or coordinated portions of cells) and this can result in a significant improvement in the coverage of high data rates, cell-edge throughput and/or overall system throughput. However, the trade-off for this improvement is that the coordination of transmissions in multi-cellular MIMO systems requires channel state information (CSI) and data information to be shared among the coordinated base stations. This in turn results in a significant additional burden on the system's transmission and data capacity resources. In particular, for FDD systems, base station channel knowledge is mainly obtained by user equipment (UE) feedback. Since multiple cells (or multiple sectors of cells) participate in the coordinated transmission, the amount of channel knowledge required to be fed back increases linearly with the number of cooperating cells (or the number of cooperating cell sectors). It will be appreciated that this can place a heavy burden on the uplink channel particularly.

As explained in the previous paragraph, coordinated multi-cell MIMO transmission/reception (also often referred to as coordinated multi-point transmission/reception or CoMP) may be used to improve the coverage of high data rates, cell-edge throughput and/or to increase system throughput. The downlink schemes used in CoMP may be considered to fall into the following two categories:

"Coordinated Scheduling and/or Coordinated Beamforming (CS/CB)" and

"Joint Processing/Joint Transmission (JP/JT)".

Incidentally, those skilled in the art will be generally familiar with the basics and underlying principles of beamforming, which is a signal processing technique that makes use of constructive and destructive interference to assist with directional signal transmission and/or reception. Further explanation of beamforming is therefore not required here.

In CS/CB, data to a single UE is instantaneously transmitted from one transmission point, but decisions regarding user scheduling (i.e. the scheduling of timings for transmissions to respective users) and/or beamforming decisions are made with coordination among the cooperating cells (or cell sectors). In other words, scheduling/beamforming decisions are made with coordination between the cells (or cell sectors) participating in the coordinated scheme.

On the other hand, in JP/JT, data to a single UE is simultaneously transmitted from multiple transmission points to (coherently or non-coherently) improve the received signal quality and/or cancel interference for other UEs.

FIG. 6 schematically illustrates the working principles of the two above-mentioned categories of downlink transmission used in CoMP, although it should be noted that the way the base stations are illustrated relative to the distribution of the cells in FIG. 6 may not accurately reflect the true distribution of base stations vis-à-vis cells in practical wireless communication system implementations. Nevertheless, FIG. 6 is sufficient for present purposes to illustrate the principles of CS/CB and JP downlink transmission schemes respectively, used in CoMP.

Joint Processing (JP) is represented in FIG. 6(*a*) in which cells A, B and C actively transmit to the UE, while cell D is not transmitting during the transmission interval used by cells A, B and C.

Coordinated scheduling and/or coordinated beamforming (CS/CB) is represented in FIG. 6(*b*) where only cell B actively transmits data to the UE, while the user scheduling/beamforming decisions are made with coordination among cells A, B, C and D so that the co-channel inter-cell interference among the cooperating cells can be reduced or eliminated.

In the operation of CoMP, UEs feed back channel state information. The channel state information is often detailed, and often includes measurements of one or more of channel state/statistical information, narrow band Signal to Interference plus Noise Ratio (SINR), etc. The channel state information may also include measurements relating to channel spatial structure and other channel-related parameters.

As explained above, feedback of channel state information allows modification of the transmitted signal (typically modification by the base station(s) prior to transmission) to account for changing channel conditions and to maximise data throughput. More specifically, it is often done in order to perform precoder design, link adaptation and scheduling at the base stations. As also explained above, for FDD systems, the amount of channel information needed to be fed back increases linearly with the number of cooperating cells (or sectors of cells), and this creates a heavy additional burden for the uplink channel particularly.

Furthermore, high performance CoMP transmission schemes are often very sensitive to channel information being outdated. Therefore, the benefits of CoMP may diminish, or may not be as realisable, in high mobility scenarios such as, for example, where UE velocities are 120 km/h or higher, since the feedback requirements necessary to enable CoMP to function optimally or well for such high velocities are difficult to satisfy. It is therefore envisaged that the present invention will typically be implemented in the context of CoMP in low and medium mobility scenarios such as, for example, with UE velocities up to approximately 30 km/h. However, it should be clearly understood that no strict limitation is to be implied from this, and the invention might also be implemented in higher mobility scenarios, possibly despite the challenges posed by the feedback requirements, or perhaps if means are devised for minimising or streamlining etc the feedback requirements making them easier to satisfy.

The remainder of this section discusses previously proposed methods and other disclosures related to the feedback of channel state information.

Chinese Patent Application No. CN101415229 discusses a method for feeding back channel state information (CSI) based on a limited feedback limit in a space division multiple access system. The method uses a quantization error threshold and a channel gain threshold to select users that should feed back CSI.

International Patent Application No. PCT/US2008/056579 presents a system and methodology for compressing CQI (channel quality indices/indicators) feedback at the receiver to reduce redundancy in CQI feedback information in wireless communications systems. To compress the CQI in the frequency domain, the main idea in this document is to feed back the CQIs of subbands whose CQIs have changed the most; and to compress the CQI in the time domain. The discrete cosine transform is performed on the CQI.

In Taiwanese patent TW274482, a method that can be applied in MIMO-OFDM systems is disclosed to reduce the feedback rate. The main proposal is to feed back the CSI for a part of frequency bands, and then CSI of all frequency bands can be represented by an interpolation on the feedback.

U.S. Pat. No. 7,359,470 proposes a method to determine the minimum feedback rate for CSI in MIMO systems. A method for estimating an expected performance loss in capacity based on the most recent feedback of the CSI is proposed. The method estimates expected performance loss based on estimated spatial covariance information. By using the estimation on the expected performance loss, the maximum tolerable channel feedback delay is calculated with which the expected capacity is greater than a predetermined threshold, and the minimum feedback rate is derived based on the maximum tolerable channel feedback delay.

In European Patent No. 1437854, the variable channel quality feedback rate in a wireless communication system is proposed based on the presence or absence of a transmission from the base station to the mobile station.

U.S. Pat. No. 7,050,759 discloses a method that reduces feedback overhead by using three separate feedback subchannels. The main idea is that the information carried on each subchannel can be used separately or together by a base station to selectively update internal registers storing channel conditions.

SUMMARY OF THE INVENTION

One aspect of the present invention (or at least an embodiment of one aspect) resides broadly in a method for use in a multiple-input multiple-output (MIMO) wireless communication system in which:

a plurality of adjacent cells are provided each containing one or more base stations operable to transmit signals to, and receive signals transmitted from, one or more users, a user is adapted to feed back to the relevant base station(s) channel state information relating to channel(s) between the relevant base station(s) and that user; and base stations are operable to adapt signals for transmission to users, based on the fed back channel state information, to account for channel variations;

the method comprising:

obtaining information related to time-variation in channel spatial structure; and adjusting the timing with which a user feeds back channel state information, based on the time variation in channel spatial structure.

Another aspect of the invention (or at least an embodiment of another aspect) resides broadly in a user equipment for use in a multiple-input multiple-output (MIMO) wireless communication system in which a plurality of adjacent cells, or sectors of cells, are provided each containing one or more base stations operable to transmit signals to, and receive signals transmitted from, the user equipment (and other user equipments), wherein the user equipment is operable to:

feed back to the relevant base station(s) channel state information relating to channel(s) between the relevant base station(s) and the user equipment, thereby enabling the base stations to adapt signals for transmission to the user equipment (and/or to other user equipments), based on the fed back channel state information;

obtain information related to time-variation in channel spatial structure; and adjust the timing with which channel state information is fed back based on the time variation in channel spatial structure.

Yet another aspect of the invention (or at least an embodiment of yet another aspect) resides broadly in a multiple-input multiple-output (MIMO) wireless communication system in which:

a plurality of adjacent cells or sectors of cells are provided, each containing one or more base stations operable to transmit signals to, and receive signals transmitted from, one or more users, one or more users are operable to feed back to the relevant base station(s) channel state information relating to channel(s) between the relevant base station(s) and each said user;

base stations are operable to adapt signals for transmission to users, based on fed back channel state information, to account for channel variations, wherein information related to time-variation in channel spatial structure is obtained and the timing with which a user feeds back channel state information is adjusted based on the time variation in channel spatial structure.

A further aspect of the invention (or at least an embodiment of a further aspect) resides broadly in a base station for use in a multiple-input multiple-output (MIMO) wireless communication system as described in the previous paragraph, wherein the base station is operable to:

transmit to one or more users a threshold of a parameter related to time variation in channel spatial structure, whereby one or more of the users calculate the parameter at successive times and feedback channel state information to the base station, and/or to one or more other base stations, at times when the parameter equals or exceeds the threshold.

In general, and unless there is a clear intention to the contrary, features described with respect to one aspect of the invention may be applied equally and in any combination to any other aspect, even if such a combination is not explicitly mentioned or described herein.

Conventionally, in MIMO wireless communication systems, the time interval at which users feed back channel state information is fixed, or if there is a different feedback time interval used in one cell (or cell sector) to another, each such time interval is typically chosen without reference to the interval in other cells/sectors. However, as explained above, in CoMP there is coordination between cells, and in fact, in the case of the joint processing (JP) downlink transmission scheme discussed above, data to a single UE is simultaneously transmitted from multiple transmission points. Therefore, the conventional fixed or independently set feedback intervals are not suitable for use in the context of CoMP.

One of the beneficial features of the present invention is that the length of the time interval between respective feedbacks of channel state information is determined taking into consideration the time variation characteristics of the MIMO channel (i.e. the way the characteristics of the channel change in time), and in particular the time variation in the spatial structure of the MIMO channel. To understand the significance of this, it should be appreciated that for fast time-variant MIMO channels, the invention can enable the feedback interval to be made shorter, while for more slowly time-variant MIMO channels it enables the feedback interval to be made longer. This can help to reduce or avoid situations where, if the state (and in particular the spatial structure) of a MIMO channel changes rapidly in time but channel state information is not sent back to the relevant base station sufficiently frequently, the information which the base station uses to perform link adaptation etc becomes outdated and inaccurate, which adversely effects system performance. On the other hand, it can also help to reduce or avoid situations where, if the state (and in particular the spatial structure) of a MIMO channel changes slowly in time, then feeding back channel state information more quickly than is necessary to achieve effective link adaptation etc simply creates an unnecessary transmission burden. The invention may therefore enable adaptive feedback interval control to be performed which, on the one hand, allows sufficiently rapid feedback as required to achieve satisfactory performance in fast time-variant MIMO channels, but without feeding back so quickly as to create an unnecessary burden on the uplink overhead. In other words, the invention may help to achieve a suitable balance between the feedback overhead and system performance. The invention may be operable to help achieve this balance in systems operating according to various CoMP transmission modes.

As is evident from the foregoing, the present invention involves signal transmissions between base stations and users in a multiple-input multiple-output (MIMO) wireless communication system. A base station may take any form suitable for transmitting and receiving such signals. It is envisaged that the base stations will typically take the form proposed for implementation in the 3GPP LTE, 3GPP LTE-A, IEEE 802.16 and 802.11 groups of standards, and may therefore be described as a NodeB or an eNodeB (eNB) as appropriate in different situations. However it is to be clearly understood that no particular limitation is to be implied from this. Indeed, subject to the functional requirements of the invention, some or all base stations may take any other form suitable for transmitting and receiving signals from users, and for adapting signals for transmission to users based on fed back channel state information.

Similarly, in the present invention, each user may take any form suitable for transmitting and receiving signals from base stations. For example, the user may take the form of a subscriber station (SS), or a mobile station (MS), or a user equipment (UE), or any other suitable fixed-position or movable form. For the purpose of visualising the invention, it may be convenient to imagine the user as a mobile handset (and in many instances at least some of the users will comprise mobile handsets), however no limitation whatsoever is to be implied from this. It is expected that users may take a form compatible with the 3GPP LTE, 3GPP LTE-A, IEEE 802.16 and 802.11 groups of standards, however, again, no particular limitation is to be implied from this.

In the wireless communication system, the arrangement of base stations with respect to each other may define the layout of the cells (and the sectors of the cells). The invention is not necessarily limited to any particular base station arrangement or cell layout. Certain preferred embodiments of the invention are described below with reference to hexagonal cell configurations in which the arrangement of base stations vis-à-vis the cells defines 3 cell sectors per cell. However, a range of other configurations may be possible.

As explained above, in the present invention, users are adapted to feedback channel state information to the relevant base station(s). It is also explained that the invention is primarily concerned with multi-cell MIMO transmission and reception, and particularly so-called coordinated multipoint (CoMP) schemes. As will be explained, different downlink modes may be used in different CoMP schemes. This is significant because the different downlink modes used in different CoMP schemes may require different feedback methods.

Feedback methods to be used in support of different downlink CoMP modes have been the subject of discussion and negotiation in this industry. As a result, it has been agreed that, at least in relation to certain kinds of wireless communication systems (such as, for example, systems compliant with 3GPP LTE-A etc), CoMP feedback mechanisms falling into the following three categories will be utilised:

Explicit channel state/statistical information feedback
Implicit channel state/statistical information feedback
UE transmission of sounding reference signal (SRS) can be used for CSI estimation at base station by exploiting channel reciprocity.

Of these three feedback mechanisms, the first two are mainly targeted at FDD systems, while the third is targeted at the TDD systems. For reasons discussed above, the present invention is aimed particularly at FDD systems and achieving a suitable balance between the feedback overhead and system performance in support of downlink CoMP.

In the first category of feedback mechanisms above (explicit channel state/statistical information feedback) the channel state information to be fed back is as observed by the receiver without assuming any transmission or receiver processing. In contrast, the second feedback mechanism category (implicit channel state/statistical information feedback) uses hypotheses of different transmission and/or reception, for example relating to channel quality index (CQI), precoding matrix index (PMI), rank information (RI) pertaining to the channel matrix, etc.

However, for the avoidance of doubt, it is to be clearly understood that the invention is not necessarily limited to any of the above (or any other) feedback methods or mechanisms. Any feedback mechanism which is suitable, given the downlink modes used in the system in which the invention is implemented, may be used. The kind of information which may be fed back in, or as part of, the channel state information includes Bit-Error Rate (BER), Channel BER (CBER), Carrier-to-Noise Ratio (CNR), Signal to Interference Noise Ratio (SINR), Modulation Error Ratio (MER) and any other statistical or other information that is related to channel spatial structure, and/or time variation therein, such as channel matrix information, spatial correlation matrix information, PMI, RI and codebook. These are just examples, and other quantities, or similar quantities presented in a different form, may also be transmitted.

In the present invention, the base stations are preferably able to adapt signals for transmission to users, based on channel state information fed back to them, in order to account for channel variations (in particular changes in channel spatial structure) and maximise data throughput. More specifically, they will preferably be able to perform precoder design and link adaptation. Specific details of precoder design and link adaptation are outside the scope of the present explanation.

Importantly, in its various aspects, the invention operates to obtain information related to time variation in channel state and adjust the timing with which users feed back channel state information, based on the time variation in channel state. In particular, the invention may operate to obtain information related to time variation in channel spatial structure and adjust the timing with which users feed back channel state information based on the time variation in channel spatial structure. The information related to time variation in channel spatial structure may take a wide variety of forms, all of which are considered to fall within the scope of the present invention. In preferred embodiments, the information related to time variation in channel spatial structure is channel matrix information, spatial correlation matrix information, PMI, eigen values and eigen vectors.

In some embodiments of the invention, a parameter related to time variation in channel spatial structure may be defined. Preferably, the parameter may indicate the extent of the change in time in channel spatial structure. In some instances, it might therefore be considered representative of a rate of change. The parameter may be a scalar, vector, matrix or tensor quantity in different situations.

As those skilled in the art will appreciate, changes in channel state may occur for a range of reasons. For example, changes in channel spatial structure may be caused by Doppler effects on channels. In this example, since the Doppler spectrums of channels between the same user and different base stations may often be different, the channels in different transmitting cell sectors may undergo differing time variations. Other causes of time-variation in channel state, and channel spatial structure, will be well appreciated by those skilled in this area.

In preferred embodiments, the adjustment of the timing with which users feedback channel state information may be performed by defining a threshold of the above-mentioned parameter, calculating the parameter at successive (typically periodic) times, and causing or allowing user feedback of channel state information to one or more base stations at times when the parameter equals or exceeds the threshold. Suitably, in calculating the parameter, use may be made of the channel matrix for one or more channels. Preferably, the threshold value is stored in a look-up table, preferably obtained by simulations, at the base station or at the user equipment.

In some specific embodiments, the transmission scheme used for transmitting signals from one or more base stations to a user may involve one of coordinated scheduling (CS), coordinated beamforming (CB), joint processing (JP) with local precoding, or joint processing (JP) with weighted local precoding. These embodiments may involve using the channel matrix for each of the coordinated cells, or coordinated portions of cells, to calculate the said parameter for each said cell or cell portion, and causing or allowing user feedback of channel state information to the base station of a cell or cell portion when the parameter for that cell or cell portion equals or exceeds the threshold.

In other specific embodiments, the transmission scheme used for transmitting signals from one or more base stations to a user may involve joint processing (JP) with global precoding. These other embodiments may involve calculating a concatenated channel matrix from the channel matrices of each of the coordinated cells or coordinated portions of cells, using the concatenated channel matrix to calculate the said parameter, and causing or allowing user feedback of channel state information to the base stations of the coordinated cells or portions of cells at times when the parameter equals or exceeds the threshold.

In yet further specific embodiments, the transmission scheme used for transmitting signals from one or more base stations to a user may involve joint processing (JP) with MBSFN precoding. The further embodiments may involve calculating an added up channel matrix from the channel matrices of each of the coordinated cells or coordinated portions of cells, using the added up channel matrix to calculate the said parameter, and causing or allowing user feedback of channel state information to the base stations of the coordinated cells or portions of cells at times when the parameter equals or exceeds the threshold.

BRIEF DESCRIPTION OF THE FIGURES

FIG. 1 is a schematic representation of a simplified 2×3 MIMO system and the individual SISO channels between the respective transmitter and receiver antennae.

FIG. 2 is a conceptual diagram of a more generalized MIMO system in which the transmitter has $N_T$ transmitting antennae, and the receiver has $N_r$ receiving antennae. FIG. 2 also schematically represents the introduction of noise into the signals received by the receiving antennae.

FIG. 3 is a schematic representation system similar to that given in FIG. 1, but relating to a more generalised MIMO system.

FIG. 4 is a schematic representation illustrating certain important functional components of a MIMO-OFDM transmitter.

FIG. 5 is a schematic representation illustrating certain important functional components of a MIMO-OFDM receiver.

FIG. 6(a) schematically illustrates the working principles of so-called joint processing (JP) downlink transmission used in CoMP.

FIG. 6(b) schematically illustrates the working principles of so-called coordinated scheduling and/or beamforming (CS/CB) downlink transmission used in CoMP.

DETAILED DESCRIPTION OF ASPECTS AND EMBODIMENTS OF THE INVENTION

Figure 1:
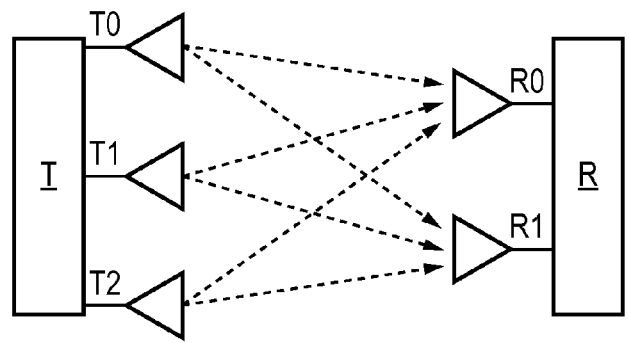
FIGS. 1-6 associated with this specification help to explain the background to the invention. The remaining figures help to explain certain features, aspects and the operation of the invention. However, it will be clearly understood that the figures are given for the purposes of explanation and to assist understanding only, and the invention is not necessarily limited to or by any of the background information, features or aspects shown in, or described with reference to, the figures. In the figures.
Figure 2:
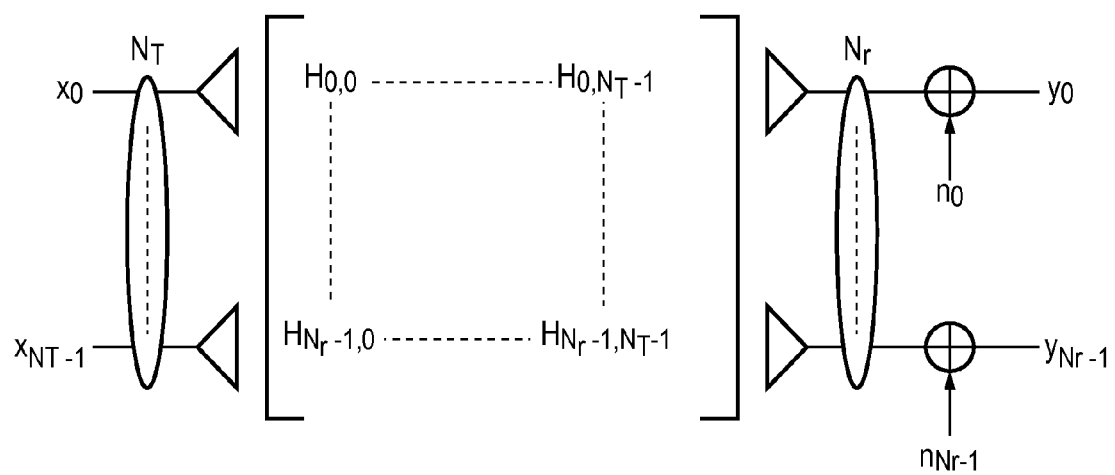
Figure 3:
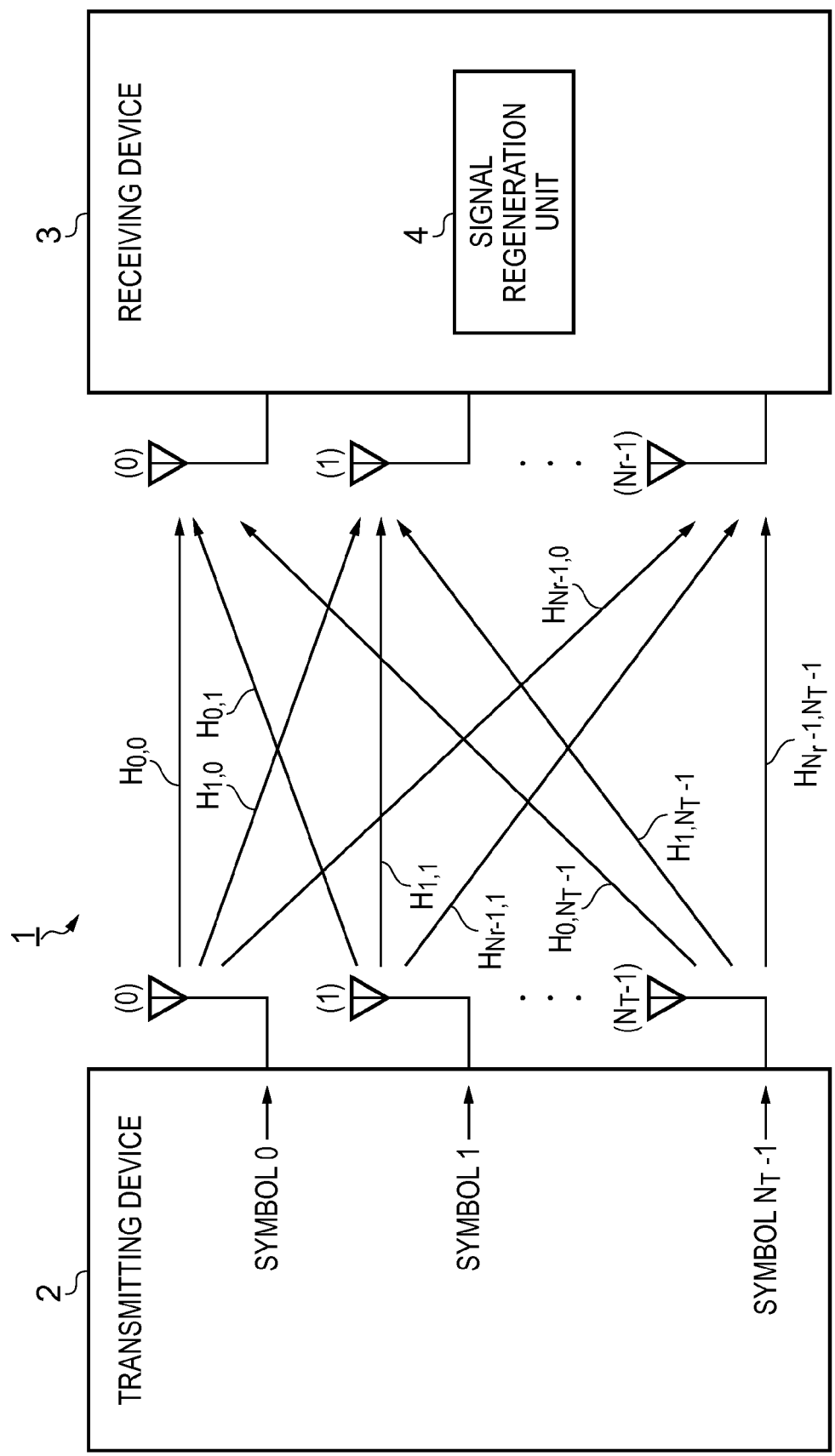
Figure 4:
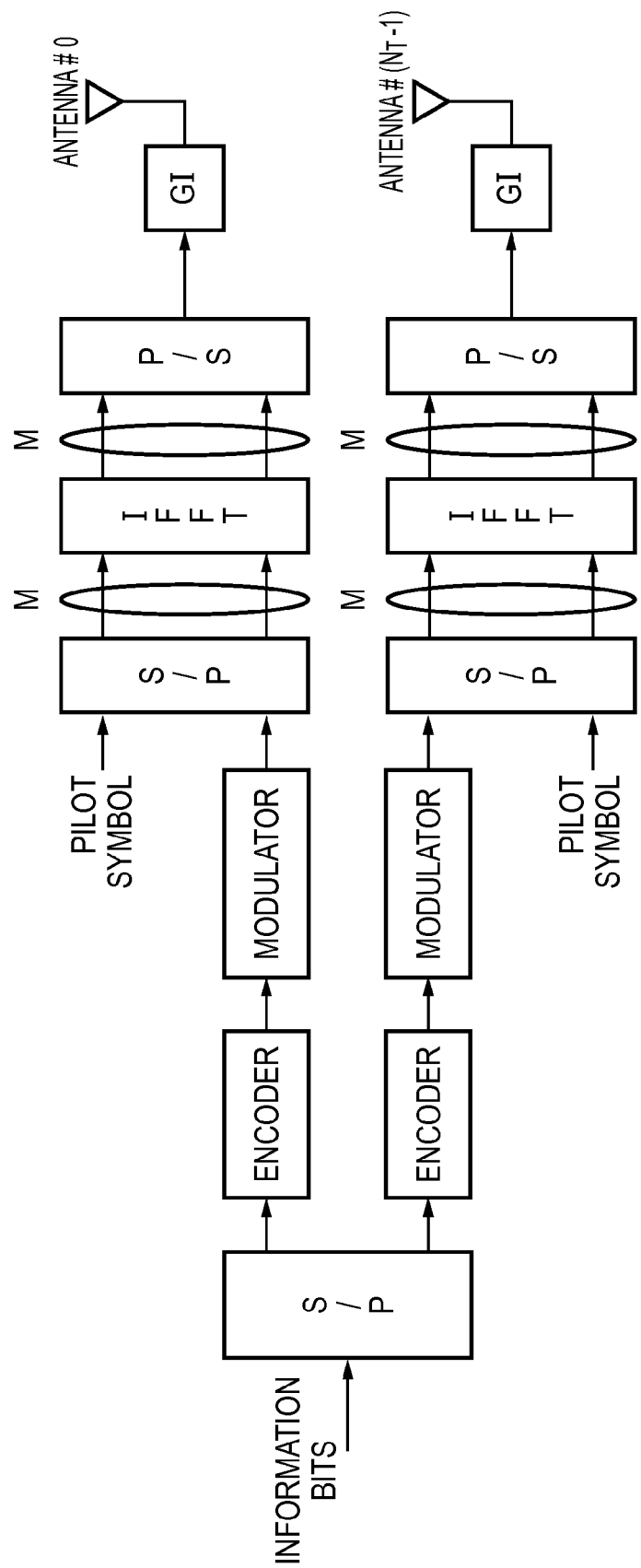
Figure 5:
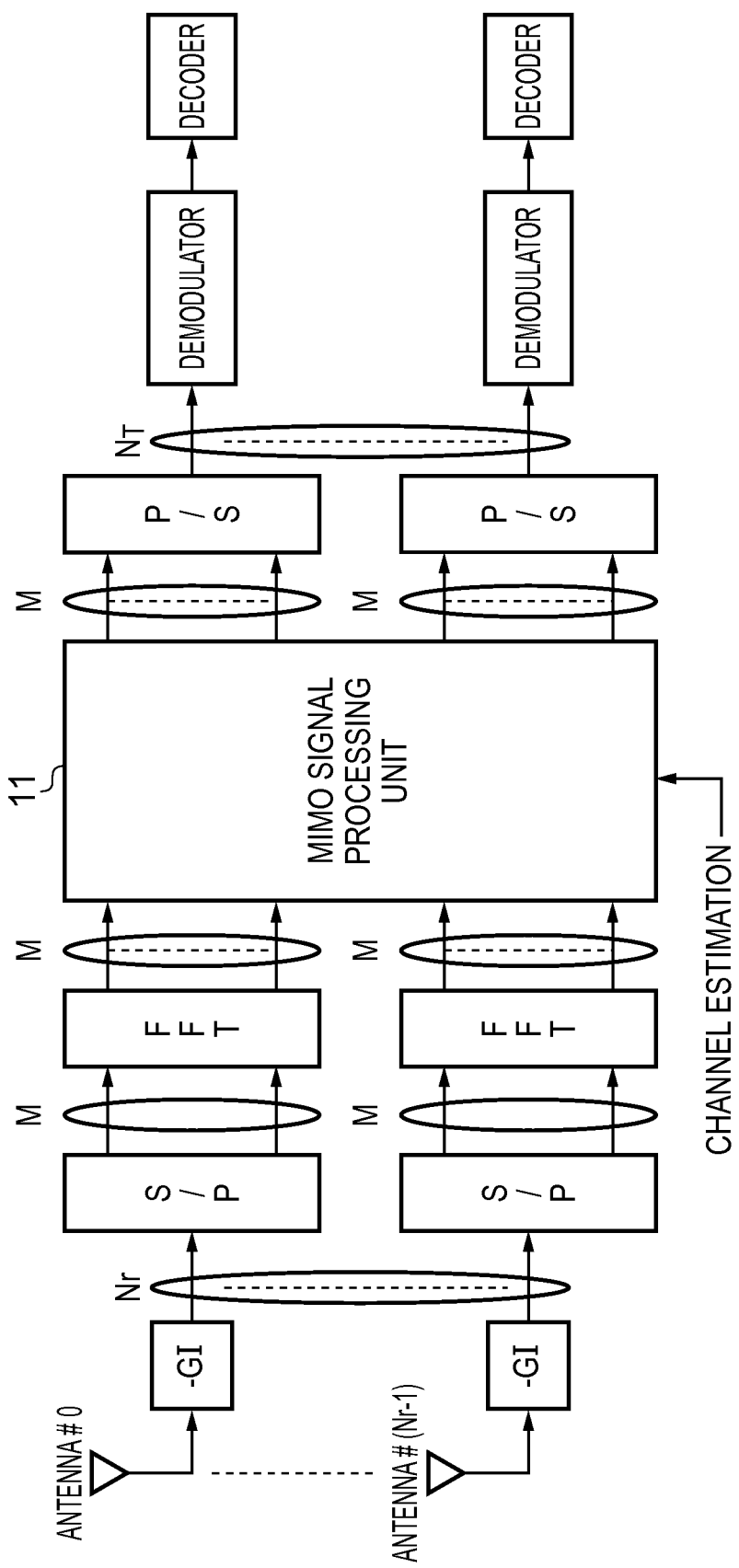
Figure 6:
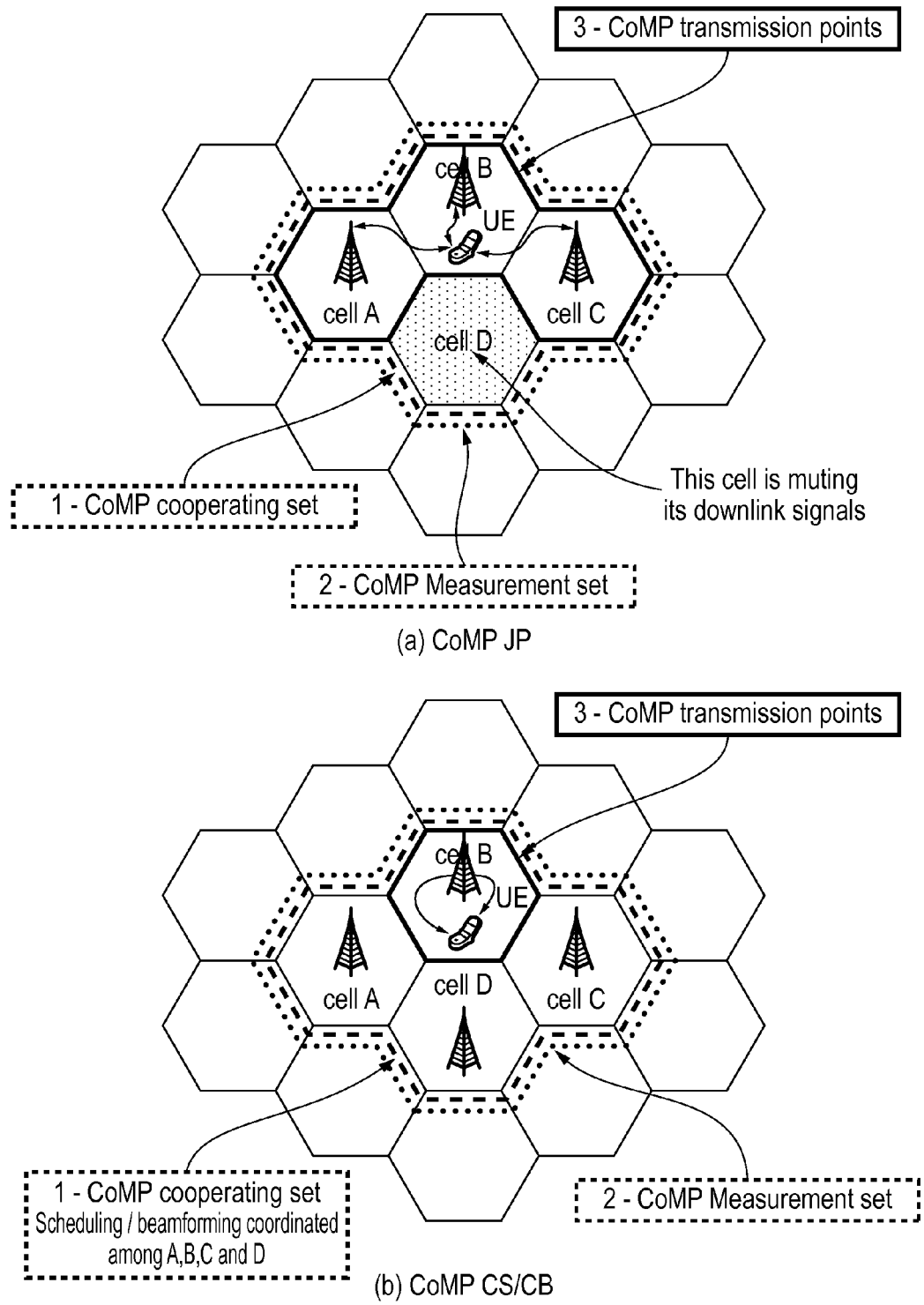

As explained above, the present invention operates to adjust the timing with which one or more UEs feed back channel state information based on the way the channel state changes in time. In preferred embodiments, the feedback interval can be adaptively altered based on a parameter related to time variation in channel spatial structure.

In the particularly preferred embodiments of the invention that are described below, the parameter which is chosen for this purpose will be referred to as the "extended correlation matrix distance" or "wideband correlation matrix distance" (i.e. extended CMD or wideband CMD—these terms may be considered interchangeable) and will be represented by the symbol $d_{wd\_corr}$. However, as has been noted previously, the invention is not necessarily limited to the use of this particular parameter, and it is possible that other embodiments of the invention might alternatively operate using other parameters related to time variation in channel state, or in channel spatial structure, or indeed using any other means for adapting the feedback interval based on time variation in channel state or spatial structure.

A quantity known as the correlation matrix distance is discussed in the following document:

M. Herdin, N. Czink, H. Ozcelik, and E. Bonek, "Correlation matrix distance, a meaningful measure for evaluation of non-stationary MIMO channels", in IEEE VTC spring 2005, vol. 1, 2005, pp. 136-140.

NOTE: the correlation matrix distance metric discussed in the above document should not be confused with the "extended CMD"/"wideband CMD" $d_{wd\_corr}$ metric used in the embodiments of the invention described below, even though the two respective quantities are similar in certain respects. The distinction between them will be explained further below.

In the above document, the correlation matrix distance is introduced as a measure of the variation in the structure of narrowband fast fading MIMO channels. The above document defines the correlation matrix distance $d_{corr}$ as follows:

$$d_{corr}(R(t_1), R(t_2)) = 1 - \frac{tr\{R(t_1)R(t_2)\}}{\|R(t_1)\|_F \|R(t_2)\|_F} \in [0, 1] \quad (II)$$

where $tr(\bullet)$ denotes matrix trace, $\|\bullet\|_F$ denotes the Frobenius norm of a matrix, and $R(t_1)$ and $R(t_2)$ are spatial correlation matrices of MIMO channels determined at time samples $t_1$ and $t_2$ respectively.

For the transmitter side spatial correlation, the spatial correlation matrices are calculated as:

$$R_{Tx}(t) = E\{(H^T(t))(H^T(t))^H\}, \quad (III)$$

and for the receiver side, the spatial correlation matrices are calculated as:

$$R_{Rx}(t) = E\{H(t)H^H(t)\}, \quad (IV)$$

where $(\bullet)^H$ denotes the matrix conjugate transpose, $(\bullet)^T$ denotes the matrix transpose, $H(t)$ represents the $N_r \times N_T$ MIMO channel matrix at a time sample t for a system with $N_r$ receiver antennae and $N_T$ transmitter antennae, and $E\{\bullet\}$ is the expectation operator.

In equations (III) and (IV) above, the average is taken in the time domain to calculate the spatial correlation matrices. In other words, it is assumed that the expected value of the matrix products inside the expectation operators in (III) and (IV) are the time averages of those respective matrix products. As can be seen from equation (II), the value of the correlation matrix distance $d_{corr}$ can range between zero and one. More specifically, when the spatial correlation matrices $R(t_1)$ and $R(t_2)$ are identical (apart from a scalar factor), $d_{corr}$ is zero, while the maximum value of $d_{corr}$ is one if $R(t_1)$ and $R(t_2)$ are completely uncorrelated. As defined above, the correlation matrix distance metric can be used as a system-independent measure of the variation in the structure of narrow band fast fading MIMO channels. It allows the variation to be characterised by a single parameter, while it compares both the singular values and the subspaces of the matrices. Therefore it has the advantage of providing a simple measure while still covering the main properties of the MIMO channel.

The properties of the correlation matrix distance metric mentioned above, namely that is a system-independent measure, and that it allows variation to be characterised by a single parameter whilst comparing both singular values and subspaces of matrices, are considered useful properties from the point of view of the present invention. However, the presently described embodiments of the invention focus on time variation in the spatial structure of wideband fast fading MIMO channels not in the structure of narrowband fast fading MIMO channels, which is the focus of the correlation matrix distance defined above. Therefore, for the purposes of the presently described embodiments, the correlation matrix distance metric is modified in order to provide a measure of the time variation in wideband fast fading MIMO channel spatial structure, and also to provide such a measure in various CoMP scenarios. In other words, the correlation matrix distance metric is modified to become the extended CMD (or wideband CMD) $d_{wd\_corr}$ used in the embodiments described below. The extended CMD metric $d_{wd\_corr}$ for wideband fast fading MIMO channels may be defined as:

$$d_{wd\_corr}(R_{wd}(t_1), R_{wd}(t_2)) = 1 - \frac{tr\{R_{wd}(t_1)R_{wd}(t_2)\}}{\|R_{wd}(t_1)\|_F \|R_{wd}(t_2)\|_F} \in [0,1], \quad (V)$$

where, similar to the correlation matrix distance described with reference to equations (II) to (IV) above, $R_{wd}(t_1)$ and $R_{wd}(t_2)$ are spatial correlation matrices determined at time samples $t_1$ and $t_2$ respectively, in this case for wideband fast fading MIMO channels.

Also, in contrast to equations (II) to (IV) above, for the purposes of calculating the extended CMD $d_{wd\_corr}$ using equation (V), for the receiver side spatial correlations, for example, the calculations of $R_{wd}(t_1)$ and $R_{wd}(t_2)$ are performed using the following equation:

$$R_{wd\_Rx}(t) = E\left\{\frac{1}{N}\sum_{f=1}^{N} H(t,f)H^H(t,f)\right\} = E\{R_{Rx\_avg}(t)\} \quad (VI)$$

where H(t,f) is the time-variant transfer matrix obtained by applying Fourier transformation to the time-variant impulse response matrix (i.e. the time variant channel matrix) $H(t,\tau)$ and N is the Fourier transformation size (not to be confused with $N_T$ and $N_r$ which are the number of antennae at a MIMO transmitter and a MIMO receiver respectively). In the wideband case, calculations of spatial correlation matrices at the receiver side $R_{wd\_Rx}(t_1)$ and $R_{wd\_Rx}(t_2)$ are based on the averaged channel correlation matrix over the bandwidth $R_{Rx\_avg}(t)$. In simulations, this time domain average is taken over a length S sliding window, such that:

$$R_{wd\_Rx}(t) = \frac{1}{S}\sum_{s=0}^{S-1} R_{Rx\_avg}(t-s) \quad (VII)$$

As for the basic correlation matrix distance metric $d_{corr}$ discussed above with reference to equations (II) to (IV) (which related to variation in the structure of narrowband fast fading MIMO channels), for the wideband CMD $d_{wd\_corr}$ used in the embodiments of the invention described below (which relates to time variation in the spatial structure of wideband fast fading MIMO channels), if $R_{wd}(t_1)$ and $R_{wd}(t_2)$ are identical, then the wideband CMD $d_{wd\_corr}$ is zero; whereas if they vary radically, it will tend to one.

It should be noted that, adjustments to equation (VI) can also be made for the purpose of calculating the wideband CMD metric $d_{wd\_corr}$ given by (V) in different scenarios. For example, for wideband MIMO channels, if the time variation for a certain frequency is of interest, then equation (VI) may be rewritten as:

$$R_{Rx,f}(t,f) = E\{H(t,f)H^H(t,f)\}, \quad (VIII)$$

and in simulations, the time domain average may then be performed by:

$$R_{Rx,f}(t,f) = \frac{1}{S}\sum_{s=0}^{S-1} H(t-s,f)H^H(t-s,f), \quad (IX)$$

and if the expectation operator in (VI) is taken away or the length of the sliding window S in (VII) is set to be one, then it is the time variation in the instantaneous spatial correlation matrix rather than the time averaged spatial correlation matrix that is investigated, which can indicate the change in the channel matrix.

In the preferred embodiments of the invention described below, in which various adaptive frequency interval control schemes are proposed for different CoMP scenarios, the extended/wideband CMD metric $d_{wd\_corr}$ will be used to evaluate the time variation of MIMO channels in the different scenarios. The embodiments will be described with reference to simulated multi-cell MIMO channel data. The model used to simulate the time-variant multi-cell MIMO channel is as set out in the following document:

3GPP TR 25.996: "Spatial channel model for multiple input multiple output (MIMO) simulations", V8.0.0, 2008-12.

Figure 7:
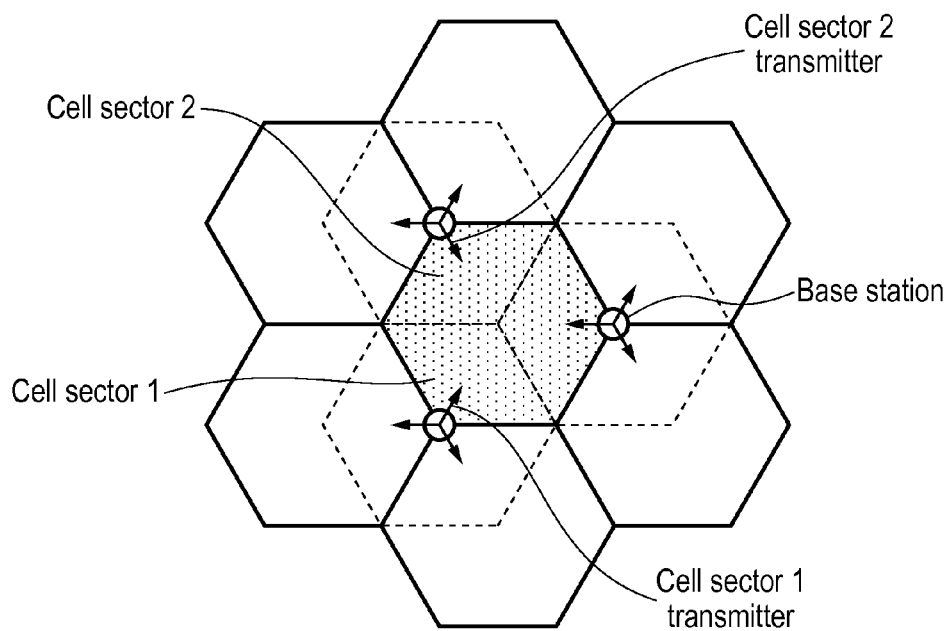
FIG. 7 schematically illustrates one way in which base stations, cells and portions (sectors) of cells may be distributed in wireless communication systems of the kind to which the present invention may be applicable. However, it will be clearly understood that base stations and cells etc may also be distributed in other ways in alternative wireless communication schemes, and the present invention may equally be applied in such other alternative schemes. In other words, the present invention is not limited to any particular form of cell/base station/cell sector distribution arrangement.

In summary, the simulated data was obtained using the urban macro scenario specified in the above document. Specifically, each cell was assumed to be hexagonal with 3 sectors per cell. An example of an arrangement of hexagonal cells with 3 sectors per cell is given in FIG. 7. In FIG. 7, the cells (delineated by solid lines) are formed with base stations located at the corners where three hexagonal cells converge. For illustrative purposes, one cell is shaded in grey in FIG. 7. Each base station has three sets of directional antennae aimed in three different directions respectively transmitting signals into, and receiving signals from, three different cells on different channels. In this way, each cell contains 3 sectors. The cell sectors are shown in FIG. 7 by the dotted lines.

Referring again to the model used to simulate the time-variant multi-cell MIMO channel, first, the impulse response matrices at different time samples between the UE and each of the sector transmitters were generated. Uniform linear arrays (ULAs) were used at the UE, and at each transmitting sector. There were two (2) antennae at the UE and eight (8) antennae at the transmitter. At the beginning of each simulation run, the position of the UE, the antenna orientation of the UE, the velocity and direction of the UE's movement, and the orientations of the antennae at different transmitting sectors were defined and assumed to be constants during the simulation period. The time interval between successive time samples was set at 1 ms (those skilled in the art will recognise that this corresponds to one subframe period in 3GPP LTE systems). At each time sample, a series of impulse response channel matrices between the UE and each sector transmitter $H(t,\tau)$ were generated and then they were transformed to a series of transfer matrices H(t,f) by Fourier transformation. The transfer matrices were then used in calculating the wideband CMD metric $d_{wd\_corr}$ to measure the time variation in the MIMO channels within each sector individually.

It should be noted that, since Doppler spectrums for the same UE in different transmitting sectors may be (and often are) different, the channels in different transmitting sectors vary differently in time. It should also be noted that, in all the simulations, the receiver side spatial correlation matrix was used to generate wideband CMDs.

Figure 8:
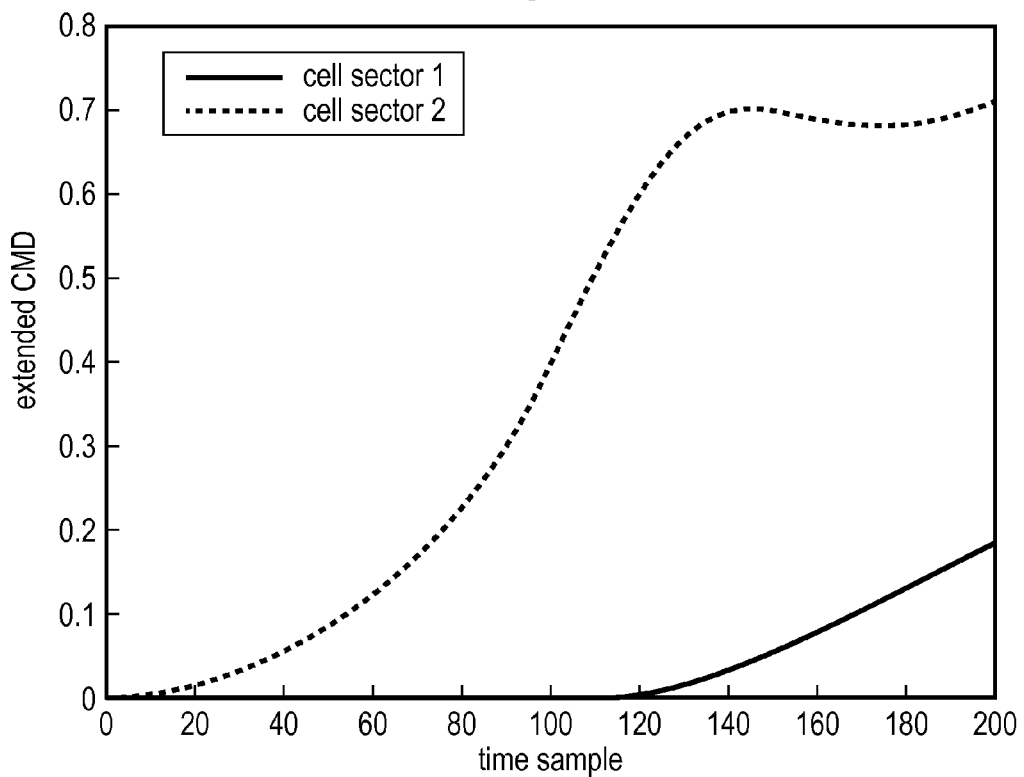
FIG. 8 shows a comparison of wideband CMDs generated between a UE and two different cell sector transmitters, assuming a UE velocity of 3 km/h, in a CoMP scheme using CB/CS downlink transmission.

FIG. 8 shows a comparison of the wideband CMDs generated, as explained above, between the UE and two different cell sector transmitters, assuming a UE velocity of 3 km/h. These two different transmitters, which may be envisaged (for example) as the cell sector 1 transmitter and cell sector 2 transmitter shown in FIG. 7, will hereinafter be referred to simply as cell sector 1 and cell sector 2 respectively. For both cell sector 1 and cell sector 2, the length of the sliding window S was set to be one, i.e. the instantaneous spatial correlation matrix was used in equation (V) to calculate the wideband CMDs. The time variation of MIMO channels was tracked for 200 time samples.

It can be seen from FIG. 8 that, during the 200 sample time period, the wideband CMD of cell sector 1 (the solid line) changed very slowly from time sample 1 to time sample 120, and from time sample 120 it gradually increased to 0.18, which means that the MIMO channel between the UE and cell sector 1 (i.e. the channel between the UE and the cell sector 1 transmitter) changed slowly for these 200 time samples and even barely varied for the first 120 sample period. On the other hand, the wideband CMD of cell sector 2 (the dashed line) grew much more quickly than that of cell sector 1, and stayed around 0.7 after time sample 140. In general, differences such as this may be attributed to different Doppler spectrums of channels between the same UE and different transmitters.

Therefore, it should now be appreciated that, in the case of CB/CS downlink transmission (where data to a single UE is instantaneously transmitted from one transmission point, but decisions regarding user scheduling and/or beamforming are made with coordination among cells or cell sectors), the feedback intervals at which the UE sends back updated channel information to cell sector transmitters should be treated differently for different cell sectors. Taking the simulation results shown in FIG. 8 as an example, let it be assumed that cell sector 1 is the cell sector whose transmitter is transmitting data to the UE, and that cell sector 2 is a cooperating cell sector. If a fixed feedback interval control method were to be used for both sectors (as is conventional), then this would (often inevitably) lead to either the feedback interval being shorter than is desirable from the point of view of cell sector 1, causing an unnecessary feedback overhead for cell sector 1, or the feedback interval being longer than is required to provide adequate system performance for cell sector 2.

One of the benefits provided by the present invention is that the wideband CMD metric can allow adaptation of the feedback interval for different time-variant scenarios by setting a predefined feedback wideband CMD threshold for the UE (i.e. at the beginning of the CB/CS transmission, the transmitter of the transmitting BS can send the UE a predefined threshold) and then the UE judges when to send feedback in each cell sector by comparing the wideband CMD for each said cell sector at a given time with the threshold and only feeding back in cell sectors where the extended CMD exceeds the threshold at that time. In the example given by FIG. 8, if the wideband CMD feedback threshold is set as 0.2, then there is no need to feed back to cell sector 1 until time sample 200. However, for cell sector 2, the UE needs feed back several times during the 200 time sample period.

As this illustrates, where the CB transmission mode is used, the wideband CMD-based adaptive feedback interval control method of the present invention can provide improved performance in terms of balancing feedback overhead and system performance. In many situations (i.e. particularly where the present invention prevents or does not feedback at times when feedback would otherwise have occurred had, say, a fixed feedback interval scheme been used), this may enable an appreciable saving in the feedback overhead. In very general terms, these benefits are achieved by utilising the channel matrix of each cooperating cell sector in calculating the wideband CMD for each said cell sector, which is in turn used to adaptively control the feedback interval for each cooperating cell sector.

In the case of coordinated JP transmission (where data to a single UE is simultaneously transmitted from multiple transmission points), since one of a number of different downlink precoding schemes may be used at the coordinated transmitters in different situations, different variations (i.e. different embodiments) of the proposed feedback interval control scheme are discussed separately below with reference to the different precoding schemes. The downlink precoding schemes discussed here are:
"global precoding",
"MBSFN precoding" (MBSFN stands for Multimedia Broadcast over Single Frequency Network),
"local precoding", and
"weighted local precoding".

These precoding schemes are discussed in the following document:
R1-090022, "Considerations on precoding scheme for DL joint processing CoMP", Sharp, 3GPP TSG-RAN WG1 #55bis, 12-16 Jan. 2009, Ljubljana, Slovenia.

For the global precoding scheme, the signal received by a UE which is simultaneously served by multiple cell sector transmitters can be represented as:

$$y = H_{cat} W_{cat} x + n, \quad (X)$$

where
x is the L×1 transmission data vector (L being the number of data symbols),
n is the $N_r \times 1$ additive white Gaussian noise vector,
$H_{cat}$ is the concatenated channel matrix, i.e. $H_{cat} = [H^{(1)} H^{(2)} \ldots H^{(B)}]$, where B is the number of JP cell sectors,
$H^{(b)}$ (b=1 ... B) is the $N_r \times N_T$ channel matrix between cell b and the UE,
the size of $H_{cat}$ is $N_r \times BN_T$, and
$W_{cat}$ is the $BN_T \times L$ global precoder.

Figure 9:
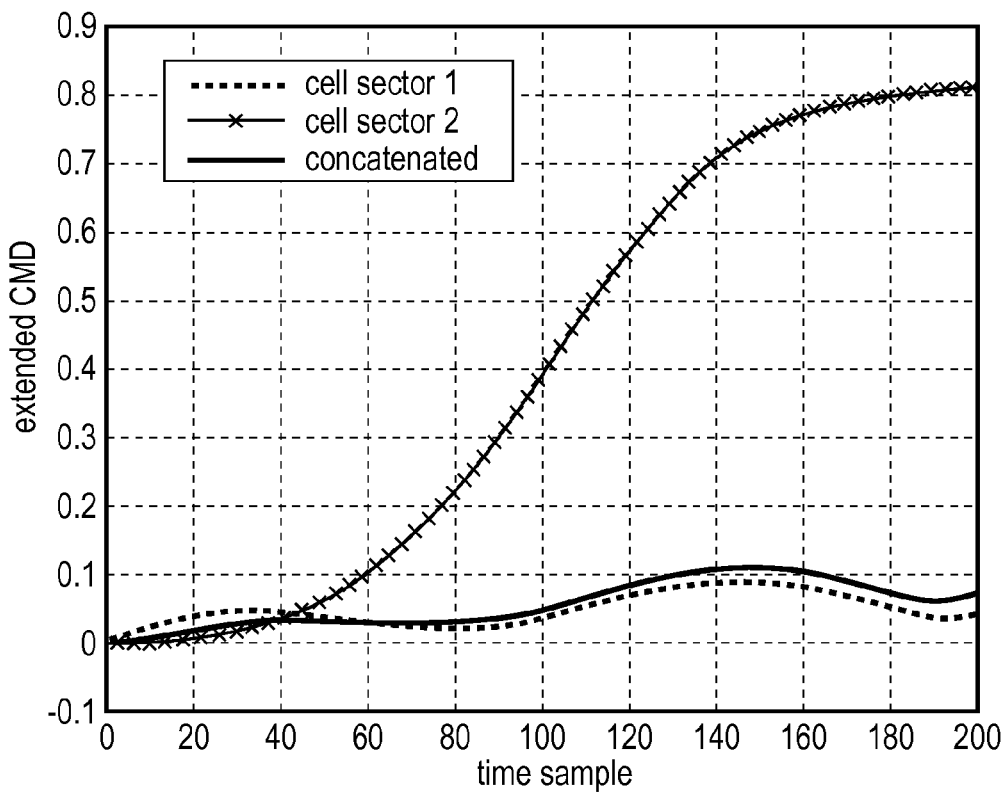
FIG. 9 shows the time variation of wideband CMDs calculated using a concatenated channel matrix from two cooperating cell sectors in a CoMP scheme using JP downlink transmission with global precoding.

To update $W_{cat}$ for all the transmitters according to the time-variant channels, the channel information which needs to be fed back is not that of a specific cell sector, but that of all the cooperating JP cell sectors. Therefore FIG. 9 shows the time variation of the wideband CMD calculated using the concatenated channel matrix, for the case that the velocity of UE is 3 km/h and the number of cooperating JP cell sectors is 2. For comparison, the wideband CMDs of individual cell sectors are also shown in FIG. 9.

From FIG. 9 it can be seen that, during the 200 time sample period, the wideband CMD calculated using the individual channel matrix of cell sector 1 (the dashed line) varies more slowly than that of the wideband CMD calculated using the individual channel matrix of cell sector 2 (the dashed and crossed line). The time variation of the wideband CMD calculated using the concatenated channel matrix (the solid line) is much slower than that calculated using either of the individual cell sector channels. This indicates that the time variation of the concatenated channel matrix is determined by the MIMO channels in all the coordinated JP cell sectors, and that the time variation of the concatenated channel matrix can be much slower than the time variation in the cell sector that has the most quickly time-variant channel.

By doing Monte-Carlo simulations, similar observations in simulation results to those shown in FIG. 9 are found approximately 90% of the time when the number of cooperating cell sectors is 2. As the number of cooperating cell sectors increases, e.g. 10 cooperating cell sectors, the probability that the concatenated channel matrix has much slower time variation than the time variation in cell sectors that have very quickly time-variant MIMO channels approaches 100%.

For the scenario shown in FIG. 9, if the present invention is used and the feedback wideband CMD threshold is set to 0.2, then there is no need to feed back during the 200 time sample period (as the extended CMD obtained using the concatenated channel matrix never reaches or exceeds 0.2). However, if a fixed feedback interval control method were to be used for both sectors (as is conventional), then this would likely lead to the feedback interval being shorter than is desirable from the point of view of cell sector 1, causing an unnecessary feedback overhead for cell sector 1, or longer than is required to provide adequate system performance for cell sector 2. Furthermore, even if the feedback interval of each cell sector were to be controlled individually based on its own extended CMD metric, then there would not be any feedback in cell sector 1 during this time period (as the extended CMD for individual cell sector 1 never reaches 0.2), but several feedbacks would be required in cell sector 2 (as the extended CMD for individual cell sector 2 exceeds 0.2 after about 80 time samples), and this would also cause an unnecessary overhead compared with the situation explained for this embodiment, where the concatenated channel matrix for all cooperating cell sectors is used to calculate the wideband CMD, which as described above, results in there being no need to feedback during the 200 time sample period.

Hence, where the JP transmission mode is used with global precoding, the wideband CMD-based adaptive feedback interval control method of the present embodiment can provide improved performance in terms of balancing feedback overhead and system performance. In many situations (i.e. particularly where the present invention prevents or does not feedback at times when feedback would otherwise have occurred had, say, a fixed or individually cell-set feedback interval scheme been used), this may enable an appreciable saving in the feedback overhead. In very general terms, these benefits are achieved by utilising the concatenated channel matrix in calculating the wideband CMD, which is in turn used to adaptively control the feedback interval for the different cooperating cell sectors.

For JP downlink transmission using the above mentioned MBSFN precoding scheme, the signal received by a UE which is simultaneously served by multiple cell sector transmitters can be represented as:

$$y = \left(\sum_{b=1}^{B} H^{(b)} W\right) x + n = H_{sum} W x + n, \quad \text{(XI)}$$

where
the definitions of x, n and $H^{(b)}$ are the same as those used in (X),
$H_{sum}$ is the added up channel matrix with dimensions being $N_r \times N_T$ assuming $N_T$ transmitter antennae at each cell sector transmitter, and
W is the common precoding matrix for all JP cell sectors, whose size is $N_T \times L$.

Similar to the case of the global precoding scheme discussed above, in order to update W where MBSFN precoding is used, the channel information from all the JP cell sectors is needed. In this case, the wideband CMD is a measure of the time variation of the added up channel matrix.

Figure 10:
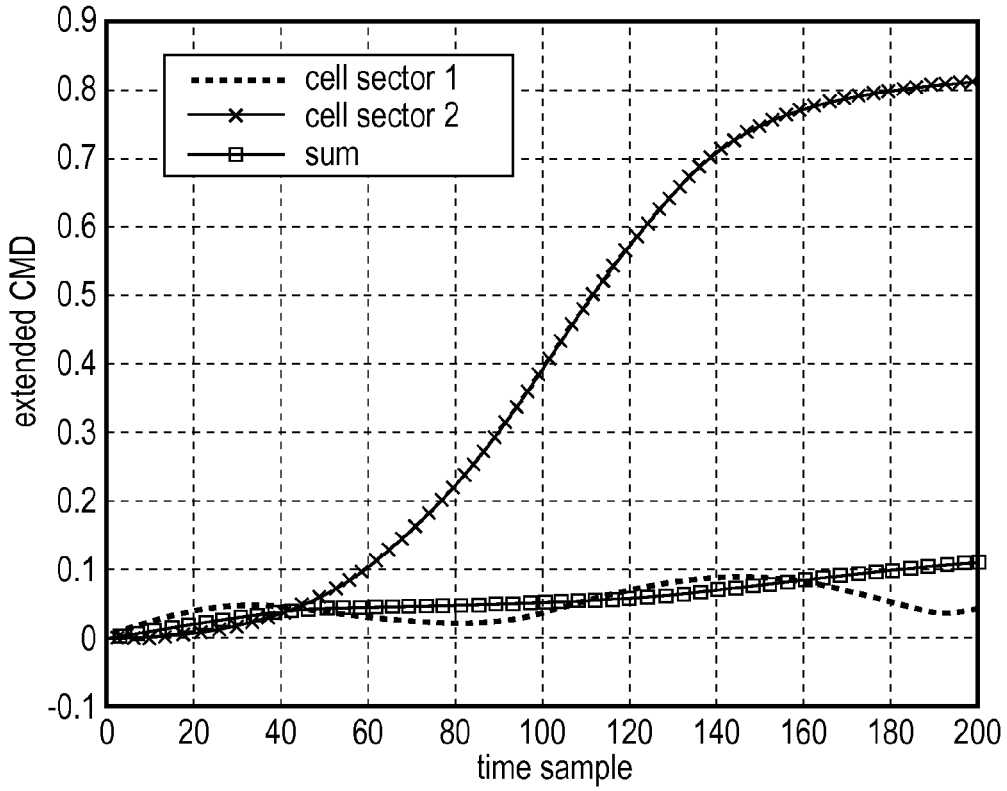
FIG. 10 shows the time variation of wideband CMDs calculated using an added up channel matrix from two cooperating cell sectors in a CoMP scheme using JP downlink transmission with MBSFN precoding.

FIG. 10 shows a comparison of the wideband CMD generated by using $H_{sum}$ with the wideband CMD calculated using the channel matrix of each JP cell sector individually, assuming that the velocity of the UE is 3 km/h and the number of JP cell sectors is 2. It can be seen that, during the 200 time sample period, the time variation of the added up channel matrix tends to be influenced more by the slowly time varying channel in cell sector 1 than the quickly time varying channel in cell sector 2, and the time variation of the added up channel matrix is much slower than that of the cell sector with the most quickly time varying channel.

Therefore, for similar reasons to those explained for the case of JP transmission with global precoding, where the JP transmission mode is used with MBSFN precoding, the wideband CMD-based adaptive feedback interval control method of the present embodiment can provide improved performance in terms of balancing feedback overhead and system performance. And as for JP transmission with global precoding, in many situations, this may enable an appreciable saving in the feedback overhead. In very general terms, these benefits are achieved by utilising the added up channel matrix in calculating the wideband CMD, which is in turn used to adaptively control the feedback interval for different cooperating cells.

In the case of local precoding and weighted local precoding transmission schemes, the received signal at a UE which is served simultaneously by multiple cell sector transmitters can be expressed as:

$$y = \left(\sum_{b=1}^{B} H^{(b)} W^{(b)}\right) x + n, \quad \text{(XII)}$$

and $$y = \sum_{b=1}^{B} H^{(b)} W^{(b)} D^{(b)} x + n, \quad \text{(XIII)}$$

respectively, where
$W^{(b)}$ represents the $N_T \times L$ local precoding matrix employed in JP cell sector b, and
$D^{(b)}$ in (XIII) represents the $L \times L$ cell-specific diagonal matrix consisting of weighting coefficients for each JP cell sector.

From (XII) and (XIII), it can be found that, in order to update the precoding matrix $W^{(b)}$ or the weighting matrix $D^{(b)}$ for each cell sector, the channel state information of a single cell sector is required, which is similar to the case in the CB transmission scheme discussed above.

Therefore, for both of these two JP precoding schemes, the wideband CMD-based adaptive FIC method of the present invention can provide improved performance in terms of balancing feedback overhead and system performance for similar reasons to those given above in relation to CB/CS downlink transmission. Again, in many situations (i.e. particularly where the present invention prevents or does not feedback at times when feedback would otherwise have occurred had, say, a fixed feedback interval scheme been used), this may enable an appreciable saving in the feedback overhead. In very general terms, these benefits are achieved by utilising the channel matrix of each cooperating cell sector in calculating the wideband CMD, which is in turn used to adaptively control the feedback interval for different cooperating cells.

Figure 11:
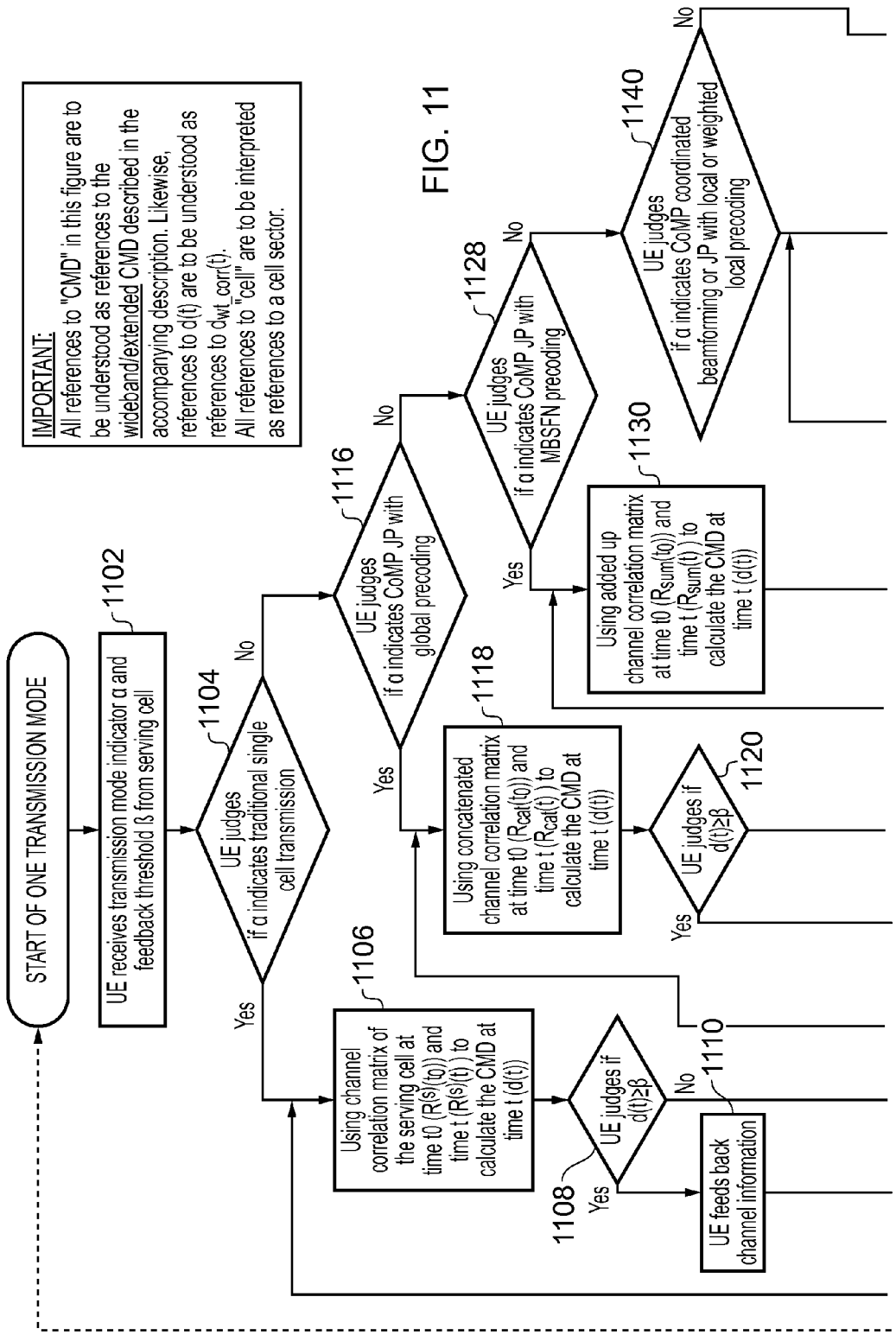
FIG. 11 is a flowchart illustrating a methodology by which various embodiments of a proposed reduced-overhead feedback interval control scheme might be implemented collectively/together.
Figure 11:
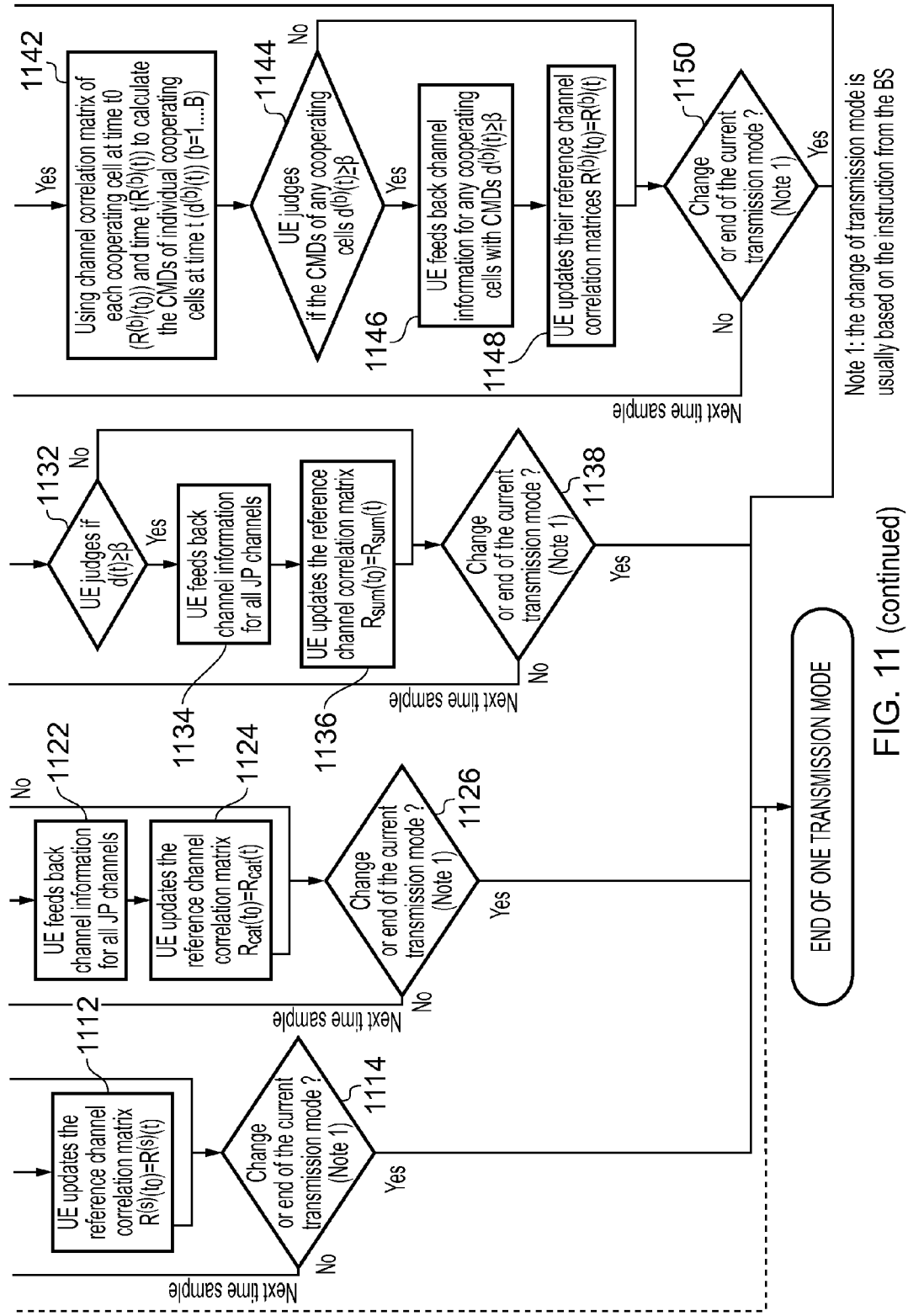

To this point, the time variations of different kinds of MIMO channels involved in various CoMP modes have been analyzed, based on which a number of variations (embodiments) of a feedback interval control scheme for CoMP have been proposed which reduce feed back overhead. FIG. 11 summarizes a methodology by which the various proposed reduced-overhead (i.e. adaptive) feedback interval control schemes might be implemented collectively/together.

As indicated in FIG. 11, at step 1102, which is at the start of a transmission according to one transmission mode, the UE receives a transmission mode indicator a and a feedback threshold β. The transmission mode indicator a indicates the particular transmission mode to be used in the transmission, and the feedback threshold β indicates the threshold value of the wideband CMD, above which feedback of channel state information by the UE should be allowed/caused.

At step 1104, the UE judges whether the transmission mode indicator a indicates transmission from a single cell sector. If it is determined that the transmission mode involves transmission from a single cell sector (i.e. "Yes" at step 1104), this indicates non-CoMP transmission (i.e. a transmission scheme where there is no coordination between cell sectors to reduce inter-cell interference), and accordingly the method then proceeds to step 1106 (it is important to note from this that the invention can be implemented in non-CoMP schemes). Alternatively, if it is determined that the transmission mode does not involve transmission from a single cell sector (i.e. "No" at step 1104), this indicates some form of CoMP transmission, and the method proceeds to step 1116 (see below).

As explained above, if it is determined at step 1104 that the transmission mode involves non-CoMP transmission from a single cell sector, the method proceeds to step 1106. At step 1106, the spatial channel correlation matrix of the serving cell sector at time $t_0$ (i.e. $R_{wd}^{(s)}(t_0)$) and the channel correlation matrix of the serving cell sector at time t (i.e. $R_{wd}^{(s)}(t)$) are used to calculate the extended CMD at time t (i.e. to calculate $d_{wd\_corr}(t)=d_{wd\_corr}(R_{wd}^{(s)}(t_0),R_{wd}^{(s)}(t))$. Next, at step 1108, the UE determines whether the calculated value of the extended CMD equals or exceeds the feedback threshold β received at step 1102. In other words, at step 1108, the UE assesses whether $d_{wd\_corr}(t) \geq \beta$. If it is determined that the value of the extended CMD is equal to or greater than the feedback threshold (i.e. if $d_{wd\_corr}(t) \geq \beta$, and hence, "Yes" at step 1108), then the UE feeds back channel state information to the serving cell sector (step 1110) and then updates the reference spatial channel correlation matrix (step 1112), i.e. the UE sets $R_{wd}^{(s)}(t_0)=R_{wd}^{(s)}(t)$. The method then proceeds to step 1114.

Returning briefly to step 1108, if (in the alternative to the above) it is determined that the value of the extended CMD is less than the feedback threshold (i.e. if $d_{wd\_corr}(t)<\beta$, and hence, "No" at step 1108), then the method proceeds directly to step 1114.

At step 1114, the UE determines whether to change or end the current transmission mode, based on information from the base station (i.e. from the serving cell sector transmitter). If it is determined not to change or end the current transmission mode ("No" at step 1114), then the method repeats from step 1106 for the next time sample. Alternatively, if it is determined to change or end the current transmission mode ("Yes" at step 1114), the method ends, and may then recommence from the very beginning based on either the same transmission mode indicator β and feedback threshold value β, or different α and/or β.

As explained above, if it is determined at step 1104 that the transmission mode does not involve non-CoMP transmission from a single cell sector (i.e. "No" at step 1104), this indicates some form of CoMP transmission, and accordingly the method proceeds to step 1116. At step 1116, the UE determines from the transmission mode indicator a whether the transmission mode correspond to CoMP with JP downlink transmission using global precoding. If it does (i.e. "Yes" at step 1116), the method proceeds to step 1118. Otherwise (i.e. if "No" at step 1116), the method proceeds to step 1128 (see below).

At step 1118, the concatenated spatial channel correlation matrix at time $t_0$, i.e. $R_{wd\_cat}(t_0)$, which is calculated using the concatenated channel matrix $H_{cat}$ (see above) at time $t_0$, and the concatenated spatial channel correlation matrix at time t, i.e. $R_{wd\_cat}(t)$, which is also calculated using the concatenated channel matrix, but at time t, are used to calculate the extended CMD at time t (i.e. to calculate $d_{wd\_corr}(t)=d_{wd\_corr}(R_{wd\_cat}(t_0), R_{wd\_cat}(t))$. Next, at step 1120, the UE determines whether the calculated value of the extended CMD equals or exceeds the feedback threshold β received at step 1102. If it is determined that the value of the extended CMD is equal to or greater than the feedback threshold (i.e. if $d_{wd\_corr}(t) \geq \beta$, and hence, "Yes" at step 1120), then the UE feeds back channel state information to all of the cooperating JP cell sectors (step 1122) and then updates the reference concatenated channel correlation matrix (step 1124), i.e. the UE sets $R_{wd\_cat}(t_0)=R_{wd\_cat}(t)$. The method then proceeds to step 1126.

Returning briefly to step 1120, if (in the alternative to the above) it is determined that the value of the extended CMD is less than the feedback threshold (i.e. if $d_{wd\_corr}(t)<\beta$, and hence, "No" at step 1120), then the method proceeds directly to step 1126.

At step 1126, the UE determines whether to change or end the current transmission mode, based on information from the cooperating cell sectors. If it is determined not to change or end the current transmission mode ("No" at step 1126), then the method repeats from step 1118 for the next time sample. Alternatively, if it is determined to change or end the current transmission mode ("Yes" at step 1126), the method ends, and may then recommence from the very beginning based on either the same transmission mode indicator α and feedback threshold value β, or different α and/or β.

As explained above, at step 1116, the UE determines from the transmission mode indicator a whether the transmission mode corresponds to CoMP with JP downlink transmission using global precoding, and if not (i.e. if "No" at step 1116), the method proceeds to step 1128. At step 1128, the UE determines from the transmission mode indicator a whether the transmission mode corresponds to CoMP with JP downlink transmission using MBSFN precoding. If it does (i.e. "Yes" at step 1128), the method proceeds to step 1130. Otherwise (i.e. if "No" at step 1128), the method proceeds to step 1140 (see below).

At step 1130, the added up channel correlation matrix at time $t_0$, i.e. $R_{wd\_sum}(t_0)$, which is calculated using the added up channel matrix $H_{sum}$ (see above) at time $t_0$, and the added up channel correlation matrix at time t, i.e. $R_{wd\_sum}(t)$, which is also calculated using the added up channel matrix, but at time t, are used to calculate the extended CMD at time t (i.e. to calculate $d_{wd\_corr}(t)=d_{wd\_corr}(R_{wd\_sum}(t_0),R_{wd\_sum}(t))$. Next, at step 1132, the UE determines whether the calculated value of the extended CMD equals or exceeds the feedback threshold β received at step 1102. If it is determined that the value of the extended CMD is equal to or greater than the feedback threshold (i.e. if $d_{wd\_corr}(t) \geq \beta$, and hence, "Yes" at step 1132), then the UE feeds back channel state information (step 1134) and then updates the reference channel correlation matrix (step 1136), i.e. the UE sets $R_{wd\_sum}(t_0)=R_{wd\_sum}(t)$. The method then proceeds to step 1138.

Returning to step 1132, if (in the alternative to the above) it is determined that the value of the extended CMD is less than the feedback threshold (i.e. if $d_{wd\_corr}(t)<\beta$, and hence, "No" at step 1132), then the method proceeds directly to step 1138.

At step 1138, the UE determines whether to change or end the current transmission mode. If it is determined not to change or end the current transmission mode ("No" at step 1138), then the method repeats from step 1130 for the next time sample. Alternatively, if it is determined to change or end the current transmission mode ("Yes" at step 1138), the method ends, and may then recommence from the very beginning based on either the same transmission mode indicator α and feedback threshold value β, or a different α and/or β.

As explained above, at step 1128, the UE determines from the transmission mode indicator a whether the transmission mode correspond to CoMP with JP downlink transmission using MBSFN precoding, and if does not (i.e. if "No" at step 1128), the method proceeds to step 1140. At step 1140, the UE determines from the transmission mode indicator a whether the transmission mode corresponds to either CoMP with CB/CS downlink transmission or CoMP with JP downlink transmission using local or weighted local precoding. If it does correspond to one of these (i.e. "Yes" at step 1140), the method proceeds to step 1142. Otherwise (i.e. if "No" at step 1140), the method ends since the transmission mode is unknown.

At step 1142, the spatial channel correlation matrix of each cooperating cell sector b at time $t_0$, i.e. $R_{wd}^{(b)}(t_0)$, calculated using the channel matrix $H^{(b)}$ (see above) at time $t_0$, and the spatial channel correlation matrix of each cooperating cell sector b at time t, i.e. $R_{wd}^{(b)}(t)$, are used to calculate the extended CMD of each cooperating cell sector b at time t. Next, at step 1144, the UE determines whether the calculated value of the extended CMD for any of the cooperating cell sectors equals or exceeds the feedback threshold β received at step 1102. If it is determined that the value of the extended CMD for any cooperating cell sector b is equal to or greater than the feedback threshold (i.e. if $d_{wd\_corr}^{(b)}(t)\geq\beta$ for any cell sector b, and hence "Yes" at step 1144), then the UE feeds back channel state information (step 1146) for each such cell sector b, and then updates the reference channel correlation matrices (step 1148), i.e. the UE sets $R_{wd}^{(b)}(t_0)=R_{wd}^{(b)}(t)$. The method then proceeds to step 1150.

Returning to step 1144, if (in the alternative to the above) it is determined that the value of the extended CMD for all cell sectors b is less than the feedback threshold (i.e. if $d_{wd\_corr}^{(b)}(t)<\beta$ for all b, and hence "No" at step 1132), then the method proceeds directly to step 1150.

At step 1150, the UE determines whether to change or end the current transmission mode. If it is determined not to change or end the current transmission mode ("No" at step 1150), then the method repeats from step 1142 for the next time sample. Alternatively, if it is determined to change or end the current transmission mode ("Yes" at step 1150), the method ends, and may then recommence from the very beginning based on either the same transmission mode indicator α and feedback threshold value β, or different α and/or β.

Those skilled in this area will appreciate that the proposed feedback interval control scheme of the present invention may also be applicable to controlling the feedback interval of channel state information for certain subbands of wideband MIMO channels, since similar observations to those shown in FIG. 8, FIG. 9 and FIG. 10 can be obtained by using the channel matrix for certain subbands to generate the relevant extended CMDs corresponding to relevant CoMP modes.

Performance Results

In the following, the performance of the proposed feedback interval control scheme is evaluated by simulation results generated by using wideband MIMO channel matrices. The discussion of the performance results is split into two stages. Stage 1 compares the proposed adaptive feedback interval control method with results obtained using fixed feedback intervals, and stage 2 analyses the performance of the proposed adaptive feedback interval control scheme in various CoMP scenarios. Stages 1 and 2 will be discussed in turn.

Stage 1: Adaptive Feedback Interval Control Vs. Fixed Feedback Interval

The analysis in stage 1 considers the proposed adaptive feedback interval control system when used in a CoMP scheme with either CB downlink transmission, or CoMP JP downlink transmission with local and/or weighted local precoding. In order to perform the analysis, the following proposed adaptive feedback interval control method was used:

a. at time $t_0$, the initial channel information of each cooperating cell sector is fed back to the network and the spatial correlation matrix of each cell sector b at time $t_0$ (i.e. $R_{wd}^{(b)}(t_0)$) is taken as reference, and then the subsequent extended CMDs of individual cell sectors are calculated using equation (V);

b. the extended CMDs of individual cell sectors at different time samples are compared with the predefined feedback threshold β. If the extended CMDs of any cooperating cells are larger than or equal to β at time t then the channel information for those cell sectors is updated by feeding back at that time. Meanwhile the reference correlation matrices of those cell sectors are updated to their correlation matrices at time t;

c. procedures a to b are repeated.

In order to compare the proposed adaptive feedback interval control scheme with a feedback scheme using fixed feedback intervals, the following was also performed:

(i). (the same as procedure a of the adaptive feedback interval control method);

(ii). at a fixed time interval δ, the channel information for all cooperating cell sectors is updated by feeding back, and the reference correlation matrices of all cooperating cells are updated every time period δ.

(iii). procedures (i) to (ii) are repeated.

For the simulations performed using the above procedures, the number of cooperative cell sectors considered was 4, the velocity of the UE was 3 km/h, and the extended CMDs were generated based on the channel correlation matrix averaged over 5 time samples, i.e. S=5. The extended CMDs at 196 time samples were plotted for each cell sector, and the time interval between neighbouring time samples is 1 ms. The value of δ and β are set to be 20 and 0.2 respectively. The results of these simulations for the fixed and adaptive methods are shown in FIG. 12 and FIG. 13 respectively.

Figure 12:
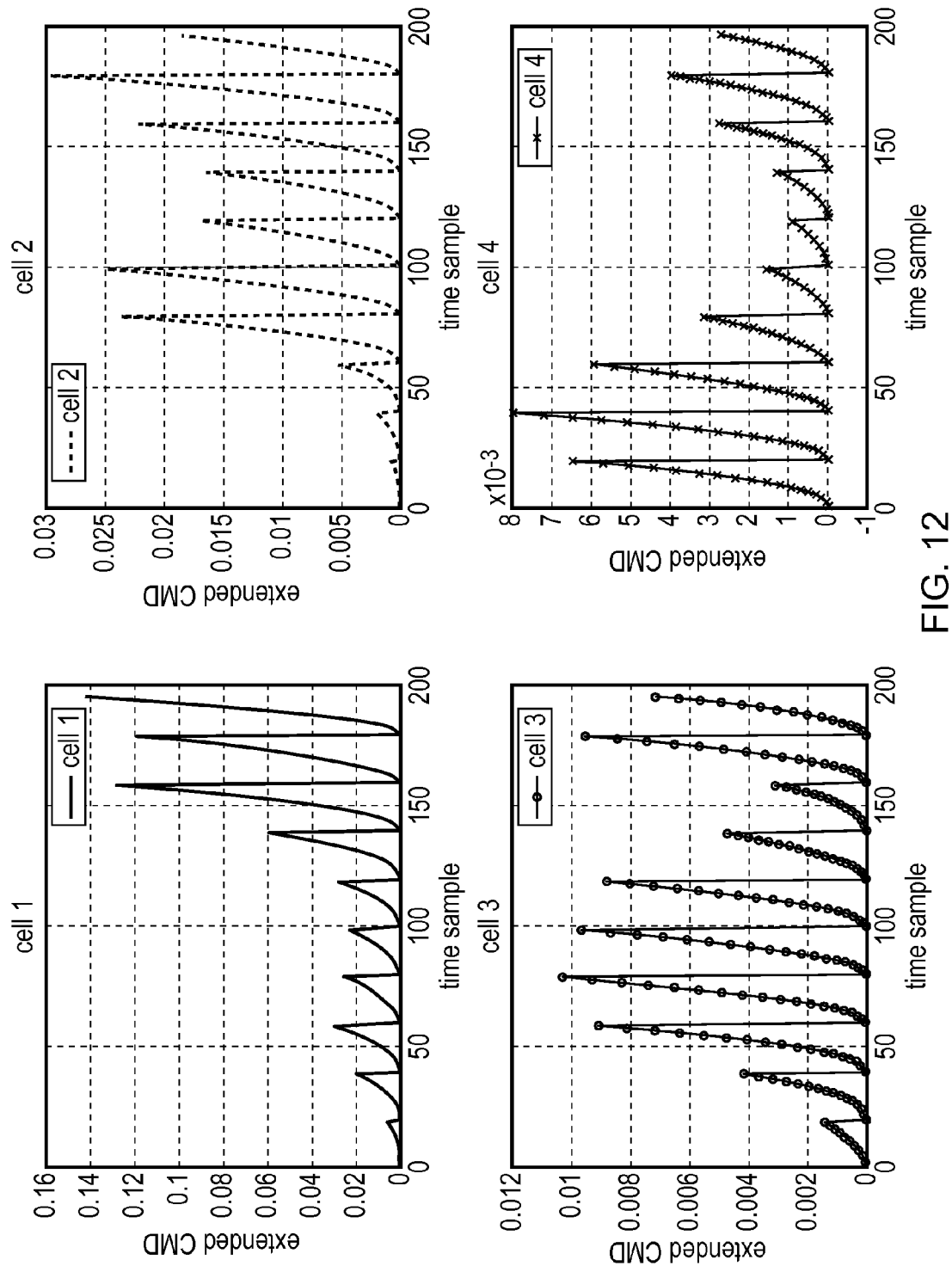
FIG. 12 contains plots of simulation results showing wideband CMD values for four cell sectors in which a fixed feedback interval scheme is used.
Figure 13:
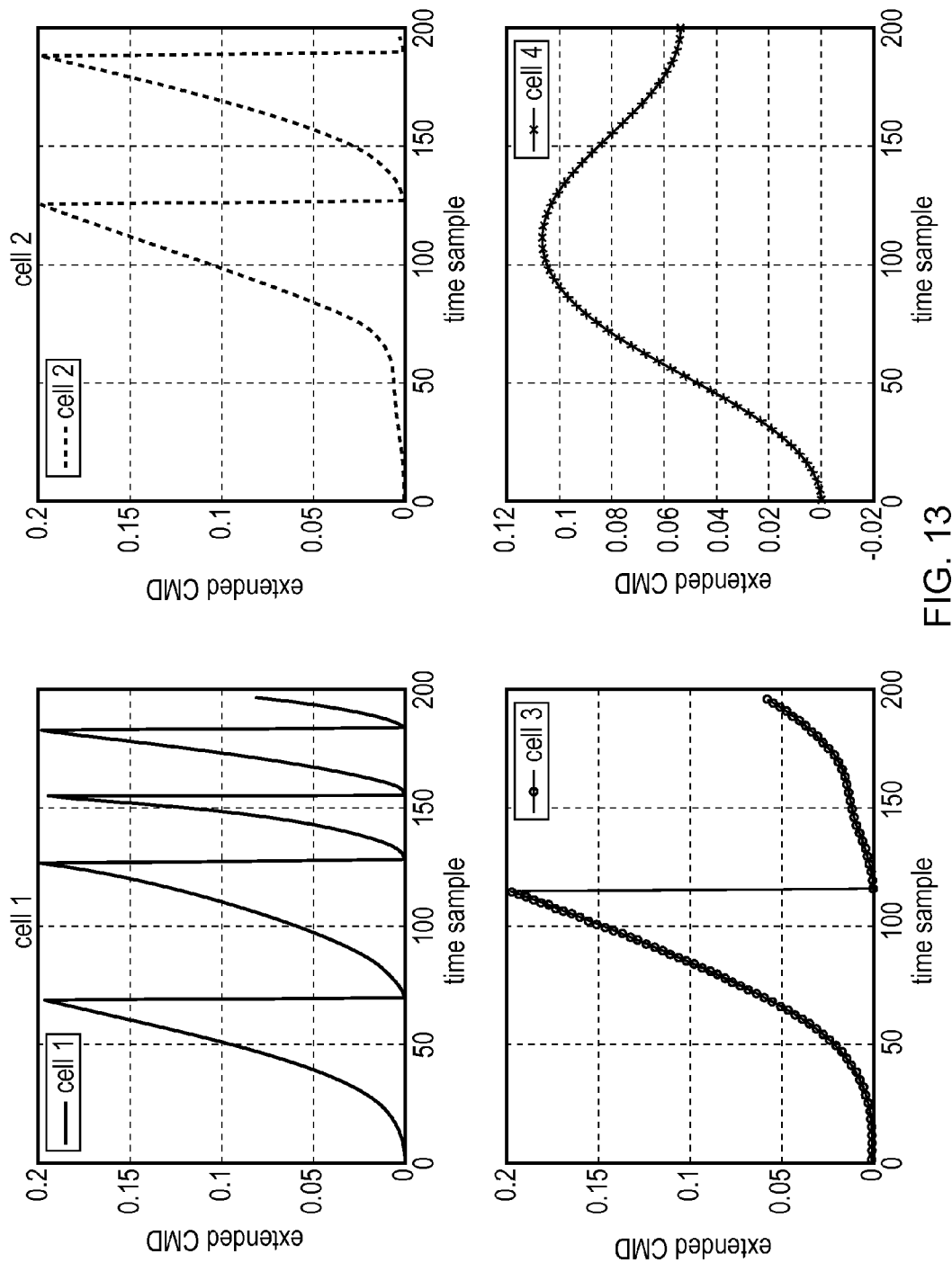
FIG. 13 contains plots of simulation results showing wideband CMD values for four coordinated cell sectors where the proposed feedback interval control scheme is used in a CoMP system with CB/CS downlink transmission, or a CoMP system with JP downlink transmission using local or weighted local precoding.

Comparing FIG. 12 and FIG. 13, it can be seen that using a fixed feedback interval can lead to many more feedback instances than using the adaptive feedback interval control method. Also, in the results shown in FIG. 12, a lot of the feedbacks are unnecessary since the extended CMDs at many of the times when feedback was performed are very low (certainly less than the threshold value of 0.2). Furthermore, in the results shown in FIG. 12, sometimes updates of the channel state information are not quick enough because the extended CMDs are already high at some times when feedback was performed.

In contrast, in the results of the adaptive feedback interval control method shown in FIG. 13, a good balance between feedback overhead and system performance is achieved. Specifically, the total number of feedback instances for the 4 cell sectors shown in FIG. 12 is 40, whereas the total number of feedback instances for the same 4 cell sectors using the proposed adaptive feedback interval control scheme, as shown in FIG. 13, is 11. This is a feedback overhead reduction of 73%. Therefore, the reduction in feedback overhead achievable using the proposed adaptive feedback interval control method can be significant. Importantly, the proposed adaptive scheme is not expected to degrade the CoMP performance in terms of system capacity or block error rate (BLER).

Figure 14:
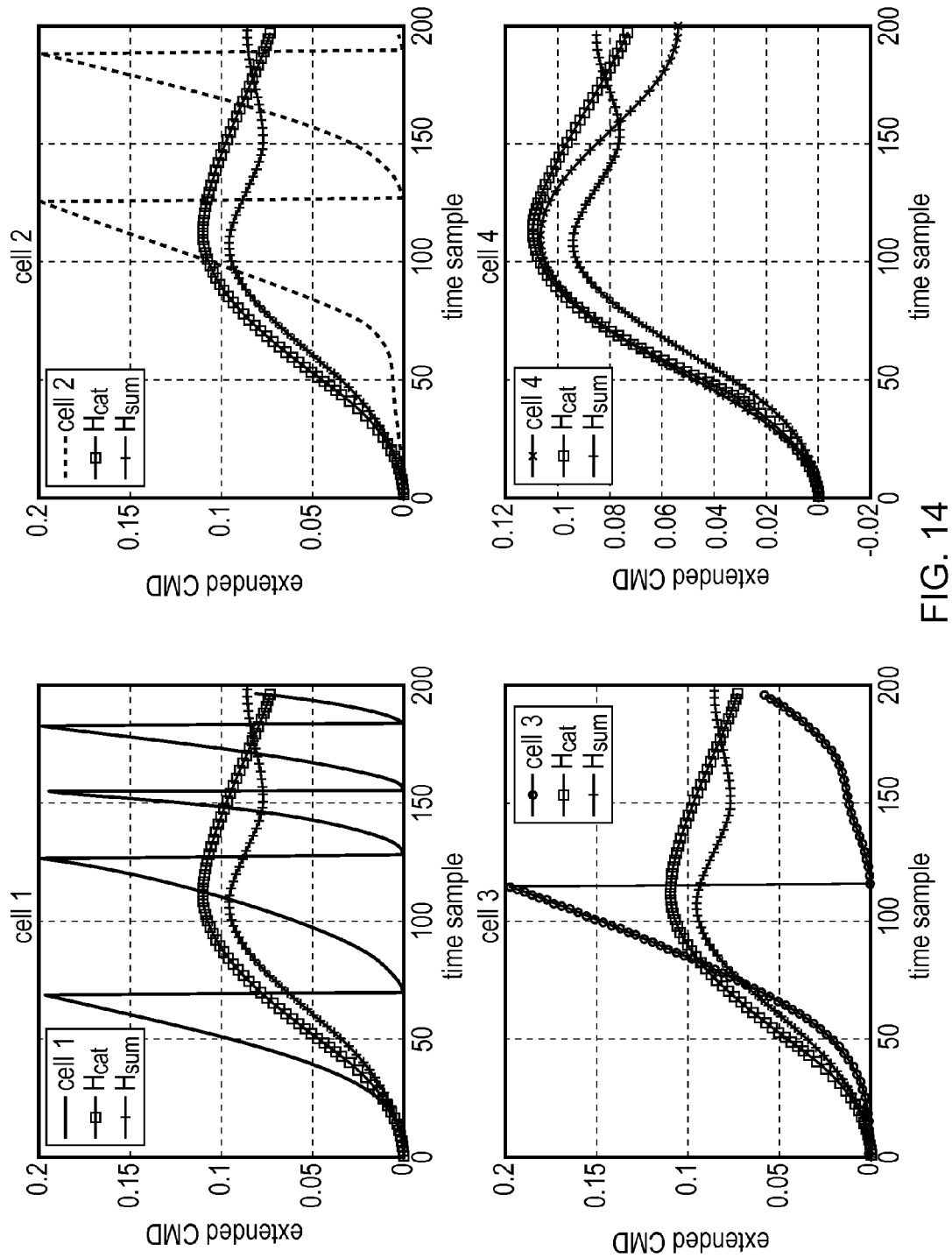
FIG. 14 is similar to FIG. 13, but also shows wideband CMD values for the four coordinated cells where the proposed feedback interval control scheme is used in a CoMP scheme with JP downlink transmission using global precoding and MBSFN precoding.

Stage 2: Performance of the Proposed Adaptive FIC Scheme in Various CoMP Scenarios FIG. 14 shows the performance of the proposed adaptive feedback interval control scheme in various CoMP scenarios. The simulation settings for FIG. 14 are the same as those for FIG. 13. In fact, the extended CMD values at each time step for individual cell sectors shown in FIG. 14 are the same as those shown in FIG. 13, and as noted above, they correspond to the proposed feedback interval control system when used in a CoMP scheme with CB downlink transmission, or in a CoMP scheme with JP transmission using local or weighted local precoding. However, in addition to this, FIG. 14 also shows extended CMD values generated at each time step using the concatenated channel matrix $H_{cat}$ and added up channel matrix $H_{sum}$ of the 4 cells, which correspond to a CoMP scheme with JP downlink transmission using global precoding and MBSFN precoding respectively.

It can be seen from FIG. 14 that by using the concatenated channel matrix and added up channel matrix, the feedback overheads required in the CoMP schemes with JP downlink transmission using global precoding and MBSFN precoding respectively, can be further reduced. For instance, the total number of feedback instances for 4 cell sectors for both of these transmission scenarios is 4, resulting in the feedback overhead reduction of 90% compared to the fixed feedback interval scheme described above. Therefore, compared to a scheme using a fixed feedback interval in each separate cooperating cell sector, the proposed scheme can significantly save feedback overhead, and it can be adapted for application in a range of different CoMP scenarios.

Figure 15:
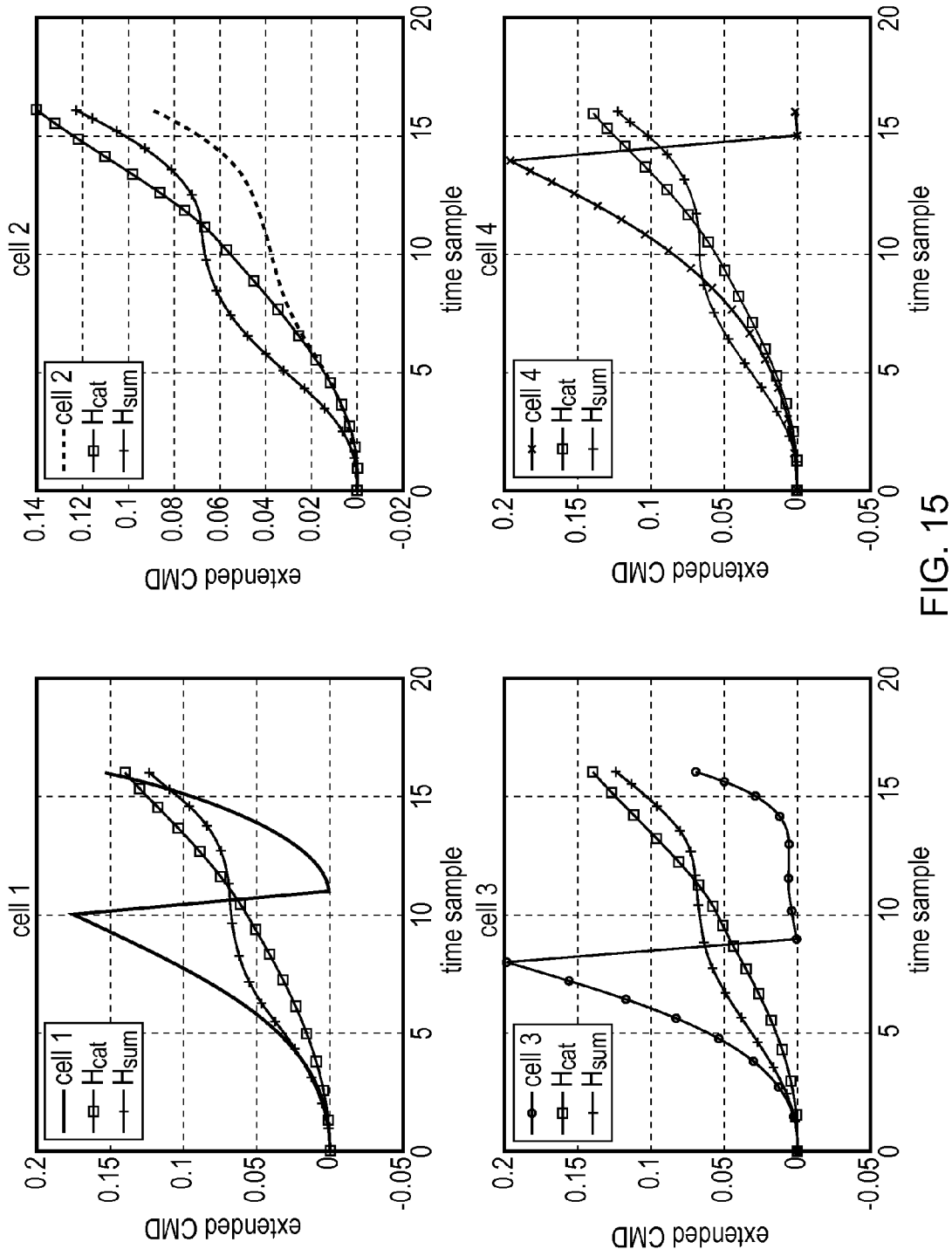
FIG. 15 shows similar simulation results to FIG. 14, but for a medium mobility scenario whereas FIG. 14 relates to a low mobility scenario.

The performance results shown in FIG. 14 correspond to various CoMP low mobility scenarios, where the velocity of the UE is 3 km/h. In contrast, FIG. 15 shows the performance of the proposed scheme in various CoMP medium mobility scenarios, where the velocity of UE is 30 km/h. The simulation settings for FIG. 15 are the same as those for FIG. 14, except that only 16 extended CMD values are plotted for each CoMP mode to evaluate the performance of the proposed scheme, since the time variation of channels is quicker as the velocity of UE increases.

Figure 16:
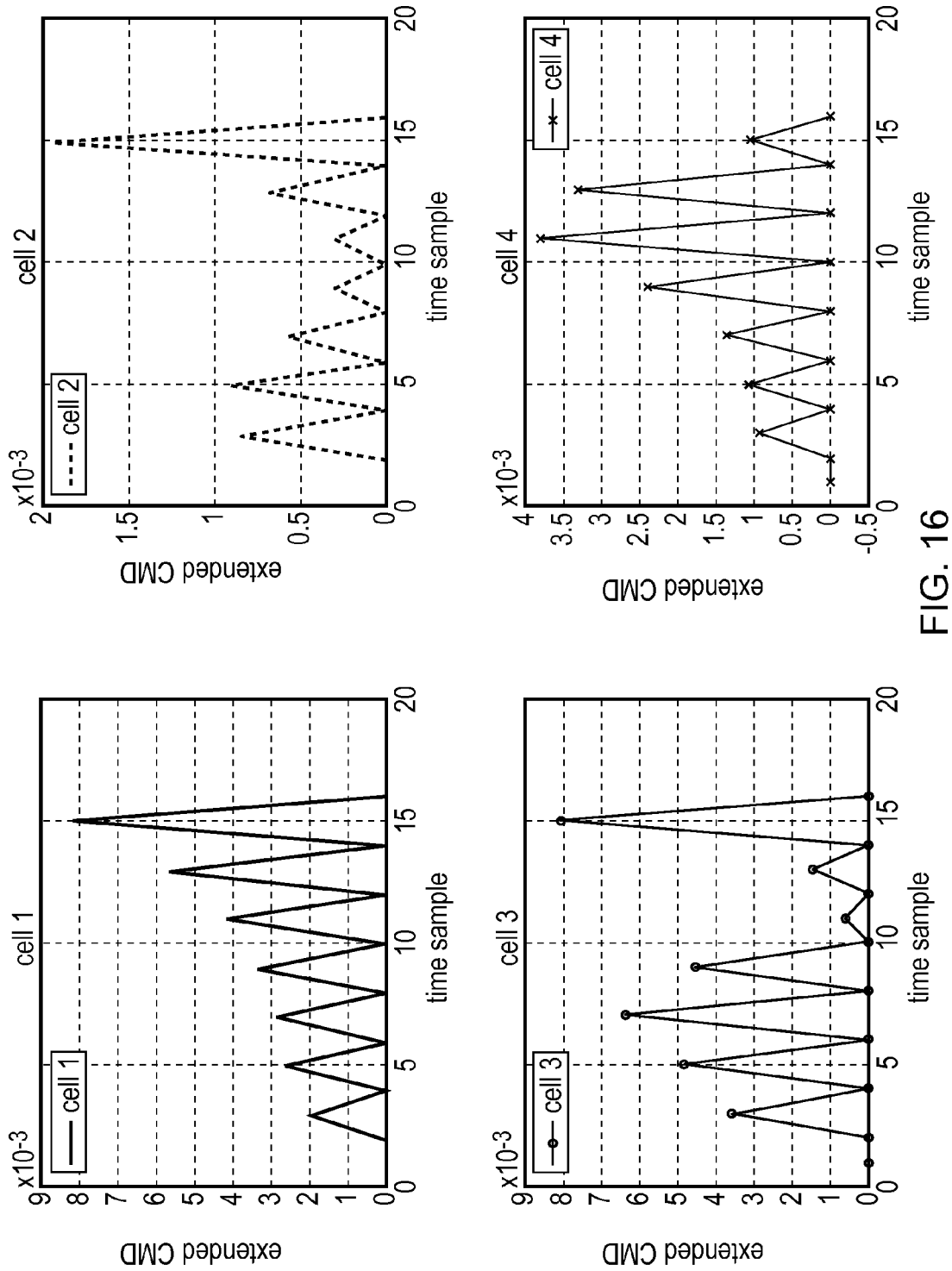
FIG. 16 contains plots of simulation results showing wideband CMD values for four cell sectors in which a fixed feedback interval scheme is used in a medium mobility scenario.

The simulation results of a fixed feedback interval method in the 30 km/h mobility scenario are shown in FIG. 16 for comparison with those given in FIG. 15. The value of 5 used for the simulation results shown in FIG. 16 is 2.

From FIG. 15, it can be seen that, for the 30 km/h mobility scenario the relative performance of different CoMP modes is similar to that for 3 km/h mobility scenario. During the 16 time sample period, for CoMP with CB downlink transmission, and also for CoMP with JP downlink transmission using local or weighted local precoding, the total number of feedback instances for 4 cell sectors is 7. Furthermore, for CoMP with JP downlink transmission using global precoding or MBSFN precoding, the total number of feedback instances for 4 cell sectors is 4. Thus the proposed scheme results in a feedback overhead reduction of 81% and 89% compared to the feedback overhead in a fixed feedback interval scheme where the total number of feedback instances is 36. Therefore, the proposed scheme is also applicable to various CoMP medium mobility scenarios.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it could, for example, be in the form of a signal such as a downloadable data signal provided from an Internet website, or it could be in any other form.

It is to be clearly understood that various changes and/or modifications may be made to the particular embodiment just described without departing from the spirit and scope of the invention.

The invention claimed is:

1. A method for use in a wideband multiple-input multiple-output (MIMO) wireless communication system in which: a plurality of adjacent cells are provided each containing one or more base stations operable to transmit signals to, and receive signals transmitted from, one or more users, a user is operable to feed back to the relevant base station(s) channel state information relating to channel(s) between the relevant base station(s) and that user; and base stations are operable to adapt signals for transmission to users, based on the fed back channel state information, to account for channel variations; the method comprising: defining a parameter related to time variation in channel spatial structure that indicates the extent of the change in time of a correlation matrix distance of spatial correlation matrices, the spatial correlation matrices being based on an averaged channel correlation matrix over a bandwidth of the wideband MIMO wireless communication system; obtaining information related to time-variation in channel spatial structure by determining a value of the parameter; and adjusting the timing with which a user feeds back channel state information, based on the time variation in channel spatial structure.

2. The method according to claim 1 further comprising:
defining a threshold of the parameter related to time variation in channel spatial structure;
calculating the parameter at successive times, and
causing or allowing user feedback of channel state information to one or more base stations at times when the parameter equals or exceeds the threshold.

3. The method according to claim 2, wherein the channel spatial structure of each channel can be represented by a channel matrix, the method further comprising using the channel matrix for one or more channels in calculating the said parameter.

4. The method according to claim 3, wherein coordination is performed between cells, or between portions of cells, for reducing inter-cell interference.

5. The method according to claim 4, wherein the transmission scheme used for transmitting signals from one or more base stations to a user involves one of coordinated scheduling (CS), coordinated beamforming (CB), joint processing (JP)

with local precoding, or joint processing (JP) with weighted local precoding, and the method further comprises:
  using the channel matrix for each of the coordinated cells, or coordinated portions of cells, to calculate the said parameter for each said cell or cell portion, and
  causing or allowing user feedback of channel state information to the base station of a cell or cell portion when the parameter for that cell or cell portion equals or exceeds the threshold.

6. The method according to claim 5, further comprising calculating the parameter, $d_{wd\_corr}$, using the equation:

$$d_{wd\_corr}\left(R_{wd}^{(b)}(t_1), R_{wd}^{(b)}(t_2)\right) = 1 - \frac{tr\{R_{wd}^{(b)}(t_1)R_{wd}^{(b)}(t_2)\}}{\|R_{wd}^{(b)}(t_1)\|_F \|R_{wd}^{(b)}(t_2)\|_F}$$

for each coordinated cell or cell sector b=1, . . . ,B (B being the number of coordinated cells or cell sectors), where $R_{wd}^{(b)}(t_1)$ and $R_{wd}^{(b)}(t_2)$ are spatial correlation matrices, representative of either the receiver side or the transmitter side, determined at time samples $t_1$ and $t_2$ respectively, each $R_{wd}^b(t)$ being determined at a time t by $$R_{wd}^{(b)}(t) = E\left\{\frac{1}{N}\sum_{f=1}^{N} H^{(b)}(t,f)(H^{(b)}(t,f))^H\right\}$$

for the receiver side, or $$R_{wd}^{(b)}(t) = E\left\{\frac{1}{N}\sum_{f=1}^{N} (H^{(b)}(t,f))^T \left((H^{(b)}(t,f))^T\right)^H\right\}$$

for the transmitter side,
where each $H^{(b)}(t,f)$ is a matrix obtained by applying Fourier transformation to the channel matrix $H^{(b)}(t,\tau)$ of a channel, and N is the Fourier transformation size.

7. The method according to claim 4, wherein the transmission scheme used for transmitting signals from one or more base stations to a user involves joint processing (JP) with global precoding, and the method further comprises
  calculating a concatenated channel matrix from the channel matrices of each of the coordinated cells or coordinated portions of cells,
  using the concatenated channel matrix to calculate the said parameter, and
  causing or allowing user feedback of channel state information to the base stations of the coordinated cells or portions of cells at times when the parameter equals or exceeds the threshold.

8. The method according to claim 7, further comprising calculating the parameter, $d_{wd\_corr}$, using the equation:

$$d_{wd\_corr}(R_{wd\_cat}(t_1), R_{wd\_cat}(t_2)) = 1 - \frac{tr\{R_{wd\_cat}(t_1)R_{wd\_cat}(t_2)\}}{\|R_{wd\_cat}(t_1)\|_F \|R_{wd\_cat}(t_2)\|_F}$$

where $R_{wd\_cat}(t_1)$ and $R_{wd\_cat}(t_2)$ are spatial correlation matrices, representative of either the receiver side or the transmitter side, determined at time samples $t_1$ and $t_2$ respectively, each $R_{wd\_cat}(t)$ being determined at a time t by $$R_{wd\_cat}(t) = E\left\{\frac{1}{N}\sum_{f=1}^{N} H_{cat}(t,f)H_{cat}^H(t,f)\right\}$$

for the receiver side, or $$R_{wd\_cat}(t) = E\left\{\frac{1}{N}\sum_{f=1}^{N} H_{cat}^T(t,f)(H_{cat}^T(t,f))^H\right\}$$

for the transmitter side
where each $H_{cat}(t,f)$ is a matrix obtained by applying Fourier transformation to the concatenated channel matrix $H_{cat}(t,\tau)$, and N is the Fourier transformation size.

9. The method according to claim 4, wherein the transmission scheme used for transmitting signals from one or more base stations to a user involves joint processing (JP) with MBSFN precoding, and the method further comprises
  calculating an added up channel matrix from the channel matrices of each of the coordinated cells or coordinated portions of cells,
  using the added up channel matrix to calculate the said parameter, and
  causing or allowing user feedback of channel state information to the base stations of the coordinated cells or portions of cells at times when the parameter equals or exceeds the threshold.

10. The method according to claim 9, further comprising calculating the parameter, $d_{wd\_corr}$, using the equation:

$$d_{wd\_corr}(R_{wd\_sum}(t_1), R_{wd\_sum}(t_2)) = 1 - \frac{tr\{R_{wd\_sum}(t_1)R_{wd\_sum}(t_2)\}}{\|R_{wd\_sum}(t_1)\|_F \|R_{wd\_sum}(t_2)\|_F}$$

where $R_{wd\_sum}(t_1)$ and $R_{wd\_sum}(t_2)$ are spatial correlation matrices, representative of either the receiver side or the transmitter side, determined at time samples $t_1$ and $t_2$ respectively, each $R_{wd\_sum}(t)$ being determined at a time t by $$R_{wd\_sum}(t) = E\left\{\frac{1}{N}\sum_{f=1}^{N} H_{sum}(t,f)H_{sum}^H(t,f)\right\}$$

for the receiver side, or $$R_{wd\_sum}(t) = E\left\{\frac{1}{N}\sum_{f=1}^{N} H_{sum}^T(t,f)(H_{sum}^T(t,f))^H\right\}$$

for the transmitter side
where each $H_{sum}(t,f)$ is a matrix obtained by applying Fourier transformation to the added up channel matrix $H_{sum}(t,\tau)$ of a channel, and N is the Fourier transformation size.

11. A user equipment for use in a wideband multiple-input multiple-output (MIMO) wireless communication system in which a plurality of adjacent cells, or sectors of cells, are provided each containing one or more base stations operable to transmit signals to, and receive signals transmitted from, the user equipment, wherein the user equipment is operable to: feed back to the relevant base station(s) channel state information relating to channel(s) between the relevant base station(s) and the user equipment, thereby enabling the base station(s) to adapt signals for transmission to the user equipment, based on the fed back channel state information; obtain information related to time-variation in channel spatial structure by determining a value of a parameter related to time variation in channel spatial structure that indicates the extent of the change in time of a correlation matrix distance of spatial correlation matrices, the spatial correlation matrices being based on an averaged channel correlation matrix over a bandwidth of the wideband MIMO wireless communication system; and adjust the timing with which channel state information is fed back based on the time variation in channel spatial structure.

12. The user equipment according to claim 11, wherein the user equipment is further operable to:
receive from a base station a threshold of the parameter related to time variation in channel spatial structure;
calculate the parameter at successive times, and
feedback channel state information to one or more base stations at times when the parameter equals or exceeds the threshold.

13. The user equipment according to claim 12, wherein the channel spatial structure of each channel can be represented by a channel matrix, and the user equipment is further operable to use the channel matrix for one or more channels in calculating the said parameter.

14. The user equipment according to claim 12, wherein coordination is performed between cells, or between portions of cells, for reducing inter-cell interference, and the user equipment calculates the said.

15. A wideband multiple-input multiple-output (MIMO) wireless communication system in which: a plurality of adjacent cells or sectors of cells are provided, each containing one or more base stations operable to transmit signals to, and receive signals transmitted from, one or more users, one or more users are operable to feed back to the relevant base station(s) channel state information relating to channel(s) between the relevant base station(s) and each said user; base stations are operable to adapt signals for transmission to users, based on fed back channel state information, to account for channel variations, wherein information related to time-variation in channel spatial structure is obtained by determining a value of a parameter related to time variation in channel spatial structure that indicates the extent of the change in time of a correlation matrix distance of spatial correlation matrices, the spatial correlation matrices being based on an averaged channel correlation matrix over a bandwidth of the wideband MIMO wireless communication system; and the timing with which a user feeds back channel state information is adjusted based on time variation in channel spatial structure.

16. A base station for use in a multiple-input multiple-output (MIMO) wireless communication system as claimed in claim 15, wherein the base station is operable to:
transmit to one or more users a threshold of the parameter related to time variation in channel spatial structure, whereby one or more of the users calculate the parameter at successive times and feedback channel state information to the base station, or to one or more other base stations, at times when the parameter equals or exceeds the threshold.

* * * * *